US 12,471,716 B2

(12) United States Patent
Shinohara et al.

(10) Patent No.: US 12,471,716 B2
(45) Date of Patent: Nov. 18, 2025

(54) POROUS STRUCTURAL BODY AND POROUS STRUCTURAL BODY MANUFACTURING METHOD

(71) Applicant: Archem Inc., Tokyo (JP)

(72) Inventors: Toshimitsu Shinohara, Tokyo (JP); Yoshiyuki Takahashi, Tokyo (JP); Yukiko Yamaguchi, Tokyo (JP); Satoshi Ienaga, Tokyo (JP)

(73) Assignee: Archem Inc., Tokyo (JP)

( * ) Notice: Subject to any disclaimer, the term of this patent is extended or adjusted under 35 U.S.C. 154(b) by 302 days.

(21) Appl. No.: 18/044,785

(22) PCT Filed: May 12, 2021

(86) PCT No.: PCT/JP2021/018112
§ 371 (c)(1),
(2) Date: Mar. 10, 2023

(87) PCT Pub. No.: WO2022/064760
PCT Pub. Date: Mar. 31, 2022

(65) Prior Publication Data
US 2023/0363547 A1 Nov. 16, 2023

(30) Foreign Application Priority Data
Sep. 24, 2020 (JP) .................. 2020-160201

(51) Int. Cl.
*A47C 27/00* (2006.01)
*B33Y 80/00* (2015.01)
(52) U.S. Cl.
CPC .............. *A47C 27/00* (2013.01); *B33Y 80/00* (2014.12)
(58) Field of Classification Search
CPC ...... A47C 27/00; A47C 27/14; B60N 2/7017; B60N 2/90
(Continued)

(56) References Cited

U.S. PATENT DOCUMENTS

| 4,337,130 A | 6/1982 | Ahramjian |
| 5,337,492 A * | 8/1994 | Anderie ............... A43B 13/181 |
| | | 36/114 |

(Continued)

FOREIGN PATENT DOCUMENTS

| CN | 109688877 A | 4/2019 |
| JP | 2019115724 A | 7/2019 |

(Continued)

OTHER PUBLICATIONS

Mar. 31, 2025, search result of Office Action issued by the China National Intellectual Property Administration in the corresponding Chinese Patent Application No. 202180064015.2.

(Continued)

*Primary Examiner* — Alicia J Weydemeyer
(74) *Attorney, Agent, or Firm* — KENJA IP LAW PC

(57) ABSTRACT

A porous structural body 1 made of flexible resin or rubber, the porous structural body includes a skeleton part 2 throughout its entirety. The skeleton part includes a plurality of bone parts 2B and a plurality of coupling parts 2J coupling end parts of the plurality of respective bone parts with each other. The skeleton part has a plurality of annular parts 211 each constituted of the plurality of bone parts and the plurality of coupling parts into an annular shape. Each annular part zones a virtual surface V1 by its inner peripheral side edge part 2111. At least a part of each of one or a plurality of the virtual surfaces is covered with one or a plurality of partially connected films 31. Each of the one or plurality of partially connected films is connected to only a part of the annular part in a peripheral direction.

20 Claims, 15 Drawing Sheets

(58) Field of Classification Search
USPC .......................................... 428/304.4–319.9
See application file for complete search history.

(56) References Cited

U.S. PATENT DOCUMENTS

| | | | |
|---|---|---|---|
| 2014/0259787 A1* | 9/2014 | Guyan | A43B 13/181 36/103 |
| 2018/0071979 A1 | 3/2018 | Achten et al. | |
| 2018/0207860 A1* | 7/2018 | Tanaka | B33Y 10/00 |
| 2019/0223618 A1 | 7/2019 | Achten et al. | |

FOREIGN PATENT DOCUMENTS

| | | | |
|---|---|---|---|
| JP | 2019534064 A | 11/2019 |
| JP | 6644183 B1 | 2/2020 |
| WO | 2011060312 A2 | 5/2011 |
| WO | 2018050558 A1 | 3/2018 |
| WO | 2019235544 A1 | 12/2019 |
| WO | 2019235547 A1 | 12/2019 |

OTHER PUBLICATIONS

Jul. 13, 2021, International Search Report issued in the International Patent Application No. PCT/JP2021/018112.
Mar. 28, 2023, International Preliminary Report on Patentability issued in the International Patent Application No. PCT/JP2021/018112.

* cited by examiner

B-B CROSS-SECTIONAL VIEW

FIG. 16
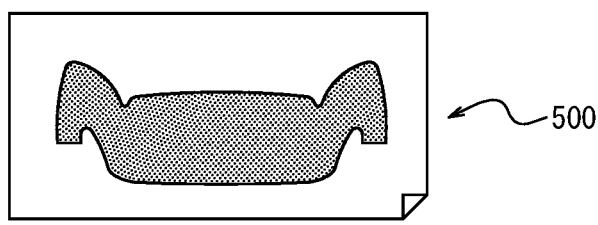
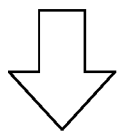
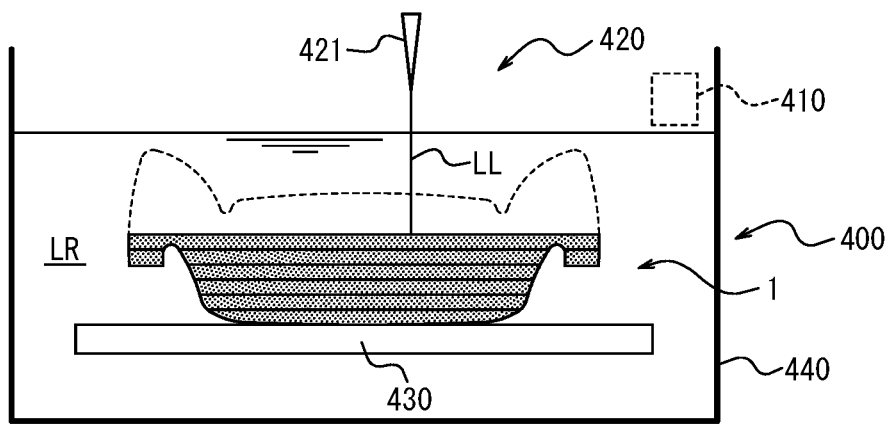
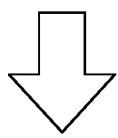
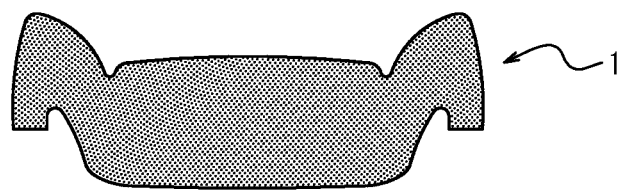

POROUS STRUCTURAL BODY AND POROUS STRUCTURAL BODY MANUFACTURING METHOD

TECHNICAL FIELD

The present disclosure relates to a porous structural body and porous structural body manufacturing method.

This application claims priority to Japanese Patent Application No. 2020-160201 filed on Sep. 24, 2020, the entire contents of which are incorporated herein by reference.

BACKGROUND

Conventionally, cushioning porous structural bodies (e.g., urethane foam) are manufactured through a process of foaming by chemical reaction, for example, in mold forming or the like.

On the other hand, in recent years, cushioning porous structural bodies that can be easily manufactured by 3D printers have recently been proposed (for example, Patent Literatures (PTLs) 1 and 2).

CITATION LIST

Patent Literature

PTL 1: WO 2019/235544
PTL 2: WO 2019/235547

SUMMARY

Technical Problem

However, there is room for improvement in the above techniques in PTLs 1 and 2 with regard to the degree of freedom in adjusting the dynamic properties of a porous structural body.

It would be helpful to provide a porous structural body and porous structural body manufacturing method that can improve the degree of freedom in adjusting the dynamic properties of the porous structural body.

Solution to Problem

A porous structural body according to the present disclosure is a porous structural body made of flexible resin or rubber, the porous structural body comprising:
  a skeleton part throughout its entirety,
  wherein
  the skeleton part comprises:
    a plurality of bone parts; and
    a plurality of coupling parts coupling end parts of the plurality of respective bone parts with each other,
  the skeleton part has a plurality of annular parts each constituted of the plurality of bone parts and the plurality of coupling parts into an annular shape,
  each of the annular parts zones a virtual surface by its inner peripheral side edge parts,
  at least a part of each of one or a plurality of the virtual surfaces is covered with one or a plurality of partially connected films, and
  each of the one or plurality of partially connected films is connected to only a part of the annular part in a peripheral direction.

A porous structural body manufacturing method according to the present disclosure manufactures, using a 3D printer, the porous structural body described above.

Advantageous Effect

According to the present disclosure, a porous structural body and porous structural body manufacturing method that can improve the degree of freedom in adjusting the dynamic properties of the porous structural body can be provided.

BRIEF DESCRIPTION OF THE DRAWINGS

In the accompanying drawings:

FIG. 16 is a diagram to describe a porous structural body manufacturing method according to an embodiment of the present disclosure, which can be used for manufacturing a porous structural body according to any embodiment of the present disclosure.

DETAILED DESCRIPTION

Figure 1:
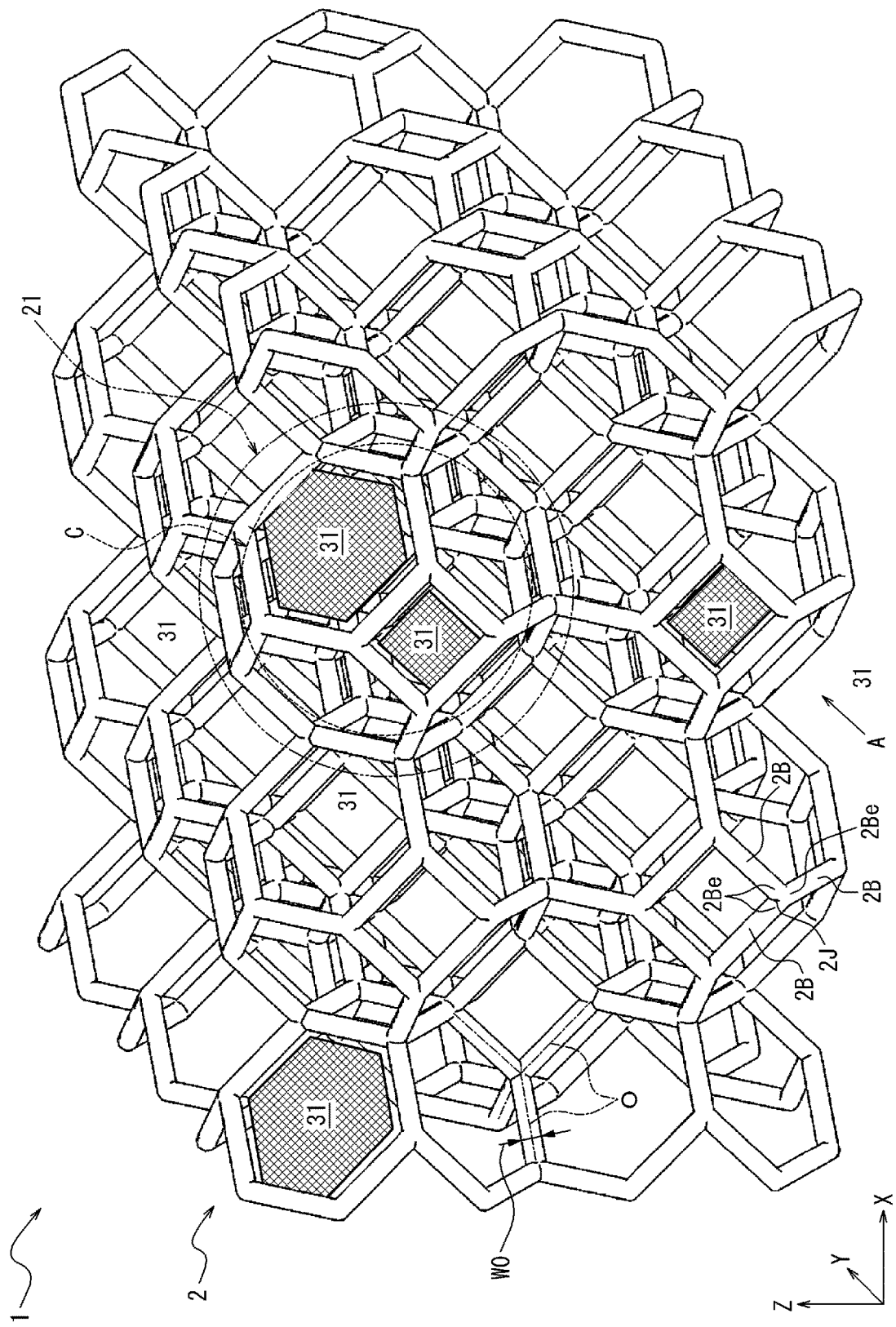
FIG. 1 is a perspective view illustrating a part of a porous structural body according to a first embodiment of the present disclosure.

A porous structural body and porous structural body manufacturing method according to the present disclosure are preferably used in cushion members, for example, are preferably used in any vehicle seats and any vehicle seat pads, and, in particular, are preferably used in car seats and car seat pads.

Embodiments of the porous structural body and porous structural body manufacturing method according to the present disclosure will be exemplarily described below with reference to the accompanying drawings.

Any common component in the drawings will be denoted with the same reference-sign.

[Porous Structural Body]

First, a porous structural body 1 will be described with reference to FIGS. 1 to 7.

In FIGS. 1 to 4, the orientation of an XYZ orthogonal coordinate system fixed to the porous structural body 1 is illustrated to facilitate understanding of the orientation of the porous structural body 1.

Figure 2:
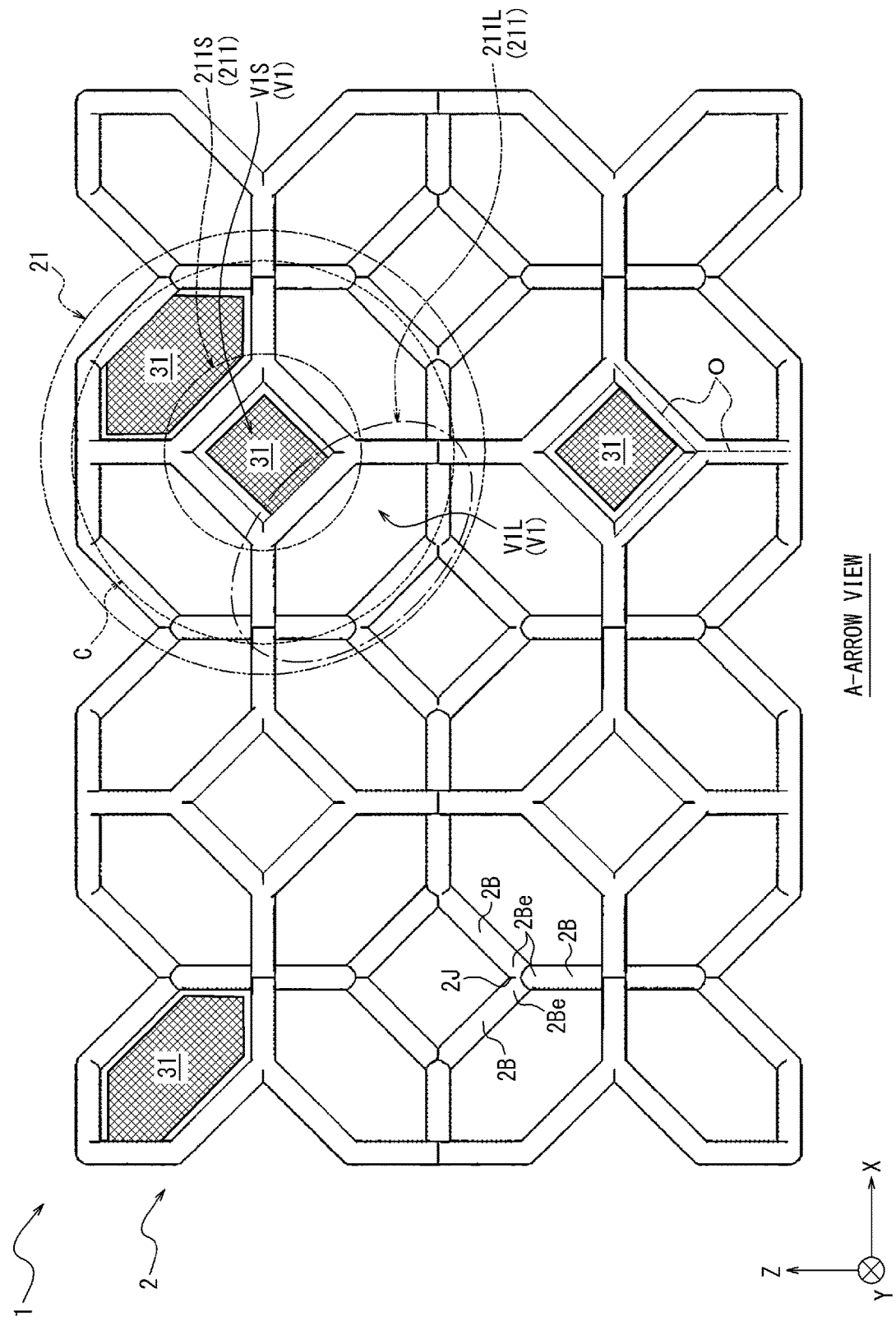
FIG. 2 is an A-arrow view illustrating the porous structural body in FIG. 1 being viewed in the direction of arrow A in FIG. 1.

In FIGS. 1 to 2, a portion having an approximately rectangular parallelepiped outer shape in the porous structural body 1 is viewed at different angles, respectively. FIG. 1 is a perspective view illustrating the portion of the porous structural body 1. FIG. 2 is an A-arrow view illustrating the portion of the porous structural body 1 in FIG. 1 being viewed in the direction (Y-direction) of arrow A.

The porous structural body 1 is shaped by a 3D printer. A porous structural body manufacturing method will be described in detail later with reference to FIG. 16. By manufacturing the porous structural body 1 using the 3D printer, the manufacture is simpler and a structure can be obtained as expected, as compared to a conventional process of foaming by chemical reaction. In addition, with future technological advances in 3D printers, it is expected that the manufacture using the 3D printer can be realized in the future in a shorter time and at a lower cost. Moreover, by manufacturing the porous structural body 1 using the 3D printer, the structure of the porous structural body 1 that meets various required characteristics can be easily realized as expected.

The porous structural body 1 is made of flexible resin or rubber.

The term "flexible resin" refers to resin that can deform when external force is applied. For example, elastomeric resins are suitable, and polyurethane is more suitable. The rubber includes natural or synthetic rubber. Since the porous structural body 1 is made of the flexible resin or rubber, the porous structural body 1 can compressively and restoratively deform in response to the application and release of external force from a user, and thus can have cushioning properties.

From the viewpoint of ease of manufacturing using the 3D printer, the porous structural body 1 is more preferably made of the flexible resin than the rubber.

From the viewpoint of ease of manufacturing using the 3D printer, the porous structural body 1 is preferably made of a material of the same composition in its entirety. However, the porous structural body 1 may be made of materials of different compositions in different parts.

When the porous structural body 1 is manufactured using the 3D printer, a resin made from light-curable polyurethane (in particular, UV-curable polyurethane) can be used as a material for constructing the porous structural body 1. As the light-curable polyurethane (in particular, UV-curable polyurethane), resins made from urethane acrylate or urethane methacrylate can be used. Such resins are described, for example, in U.S. Pat. No. 4,337,130.

As described above, the porous structural body 1 is shaped by the 3D printer. The entire porous structural body 1 is integrated.

The porous structural body 1 is made of flexible resin or rubber. More specifically, the porous structural body 1 includes a skeleton part 2 as a skeleton of the porous structural body 1. The skeleton part 2 zones a large number of cell holes C. The skeleton part 2 is present in substantially the entire porous structural body 1, and is made of flexible resin or rubber. As described below, in the present example, the porous structural body 1 includes one or a plurality of partially connected films 31, in addition to the skeleton part 2. In the present embodiment, a portion of the porous structural body 1 other than the skeleton part 2 and the partially connected films 31 is a void space, and in other words, the porous structural body 1 consists of the skeleton part 2 and the partially connected films 31.

As illustrated in FIGS. 1 to 4, the skeleton part 2 of the porous structural body 1 includes a plurality of bone parts 2B and a plurality of coupling parts 2J, and the entire skeleton part 2 is integrated. Each bone part 2B has a column shape in the present example, and extends straight in the present example. Each coupling part 2J couples, at a position where end parts 2Be in extension directions of a plurality of (for example, four) bone parts 2B extending in different directions from each other are adjacent to each other, the end parts 2Be with each other.

FIGS. 1 to 4 illustrate skeleton lines O of the skeleton part 2 in a part of the porous structural body 1 with dashed lines. The skeleton lines O of the skeleton part 2 include a skeleton line O of each bone part 2B and a skeleton line O of each coupling part 2J. The skeleton line O of the bone part 2B is a central axis of the bone part 2B. The skeleton line O of the coupling part 2J is an extended line part obtained when the central axes of the bone parts 2B connected with the coupling part 2J smoothly extend into the coupling part 2J and are coupled with each other. The central axis of the bone part 2B is a line that connects, at respective points in the extension direction of the bone part 2B, the centers of gravity of the shapes of the bone part 2B in cross sections perpendicular to the extension direction of the bone part 2B to each other.

The extension direction of the bone part 2B corresponds with an extension direction of the skeleton line O of the bone part 2B (a portion corresponding to the bone part 2B in the skeleton line O; this is same in the following).

The porous structural body 1, which substantially entirely includes the skeleton part 2, can perform compressive and restorative deformation in accordance with application and cancellation of external force while ensuring breathability, and thus has excellent characteristics as a cushion member. Moreover, the porous structural body 1 has a simple structure and thus can be easily shaped by the 3D printer.

Note that, some or all bone parts 2B of the respective bone parts 2B constituting the skeleton part 2 may extend in curved shapes. In this case, since the some or all bone parts 2B are curved, it is possible to prevent abrupt shape change of the bone parts 2B and thus the porous structural body 1 and reduce local buckling at input of load.

In the present example, the respective bone parts 2B constituting the skeleton part 2 have approximately the same shape and length. However, the present disclosure is not limited to the present example, and the shapes and/or lengths of the respective bone parts 2B constituting the skeleton part 2 may not be the same, and for example, the shapes and/or lengths of some bone parts 2B may be different from those of the other bone parts 2B. In this case, different mechanical characteristics can be intentionally obtained by differentiating the shape and/or length of the bone part 2B at a particular portion of the skeleton part 2 from the other part.

In the present example, a width W0 (FIG. 1) and a cross-sectional area of each bone part 2B are constant over an entire length of the bone part 2B (i.e., uniform along the extension direction of the bone part 2B).

Here, the cross-sectional area of the bone part 2B is a cross-sectional area of a cross section of the bone part 2B that is perpendicular to the skeleton line O. Also, the width W0 (FIG. 1) of the bone part 2B is a maximum width in the cross section, when measured along the cross section of the bone part 2B that is perpendicular to the skeleton line O.

However, in each example described in the present specification, some or all bone parts 2B of the respective bone parts 2B constituting the skeleton part 2 may each have nonuniform widths W0 and/or cross-sectional areas along the extension direction of the bone part 2B. For example, each of the some or all bone parts 2B of the respective bone parts 2B constituting the skeleton part 2 may have such a width W0 as to gradually increase or decrease toward both ends of the bone part 2B in the extension direction, in portions including the end parts 2Be on both sides of the bone part 2B in the extension direction. Also, each of the some or all bone parts 2B of the respective bone parts 2B constituting the skeleton part 2 may have such a cross-sectional area of the bone part 2B as to gradually increase or decrease toward both ends of the bone part 2B in the extension direction, in portions including the end parts 2Be on both sides of the bone part 2B in the extension direction. In the present specification, "gradually change (increase or decrease)" refers to always changing smoothly without being constant in the middle.

In each example described in the present specification, for the simple structure of the skeleton part 2 and thus for the easiness of manufacturing the porous structural body 1 by the 3D printer, the width W0 (FIG. 1) of the bone part 2B is preferably 0.05 mm or larger, more preferably 0.10 mm or larger. The shaping can be performed at the resolution of a high-performance 3D printer when the width W0 is 0.05 mm or larger, and the shaping can be performed not only at the resolution of the high-performance 3D printer but also at the resolution of a general-purpose 3D printer when the width is 0.10 mm or larger.

On the other hand, to improve accuracy in an outer edge (outer contour) shape of the skeleton part 2, make gaps (intervals) between the cell holes C small, and have excellent characteristics as the cushion member, the width W0 of the bone part 2B is preferably 2.0 mm or smaller.

Note that each bone part 2B included in the skeleton part 2 preferably satisfies the above-described configuration, but only some bone parts 2B of the respective bone parts 2B included in the skeleton part 2 may satisfy the above-described configuration, and in this case as well, the same effects can be obtained to some different extent.

In the present example, each bone part 2B constituting the skeleton part 2 has a columnar shape, and has a circular (perfectly circular) cross-sectional shape.

Consequently, the skeleton part 2 has a simple structure and thus can be easily shaped by the 3D printer. Moreover, mechanical characteristics of typical polyurethane foam, which is manufactured through a process of foaming by chemical reaction, can be easily reproduced. Therefore, the characteristics of the porous structural body 1, as a cushioning material, can be improved. Also, since the bone parts 2B have the columnar shape as described above, the durability of the skeleton part 2 can be improved as compared to a case in which the bone parts 2B are replaced with thin film parts.

Note that, the cross-sectional shape of each bone part 2B is a shape at a cross section perpendicular to the central axis (skeleton line O) of the bone part 2B.

Note that, the present disclosure is not limited to the present example, and only some bone parts 2B of the respective bone parts 2B constituting the skeleton part 2 may satisfy the above-described configuration, and in this case as well, the same effects can be obtained to some different extent.

For example, in each example described in the present specification, all or some bone parts 2B of the respective bone parts 2B constituting the skeleton part 2 may each have polygonal (regular triangular, triangular other than the regular triangular, quadrangular or the like) cross-sectional shapes, or circular (ellipsoidal or the like) cross-sectional shapes other than perfectly circular cross-sectional shapes, and in these cases as well, the same effects as those of the present example can be obtained. Also, the cross-sectional shape of each bone part 2B may be uniform along the extension direction, or nonuniform along the extension direction. Further, the respective bone parts 2B may have different cross-sectional shapes from each other.

In each example described herein, the ratio of the volume VB of the skeleton part 2 to the apparent volume VS of the skeleton part 2 (VB×100/VS [%]) is preferably 3 to 10%. This configuration allows reaction force generated in the skeleton part 2 when external force is applied to the skeleton part 2, and thus the hardness of the skeleton part 2 (and thus the hardness of the porous structural body 1), to be favorable as a cushioning material, for example, a seat pad (in particular, a car seat pad).

The "apparent volume VS of the skeleton part 2 VS" refers to the volume of an entire inner space enclosed by an outer edge (outer contour) of the skeleton part 2 (the sum of the volume occupied by the skeleton part 2, the volume occupied by the partially connected films 31 (FIG. 4) and entirely connected films 32 (FIG. 14) described below, and the volume of the void space).

Assuming that a material of the skeleton part 2 is the same, the higher the ratio of the volume VB of the skeleton part 2 to the apparent volume VS of the skeleton part 2, the harder the skeleton part 2 (and thus the porous structural body 1). The lower the ratio of the volume VB of the skeleton part 2 to the apparent volume VS of the skeleton part 2, the softer the skeleton part 2 (and thus the porous structural body 1).

From the viewpoint of making favorable the reaction force generated in the skeleton part 2 when external force is applied to the skeleton part 2, and thus the hardness of the skeleton part 2 (and thus the porous structural body 1), as a cushioning material, for example, as a seat pad (in particular, a car seat pad), the ratio of the volume VB of the skeleton part 2 to the apparent volume VS of the skeleton part 2 is more preferably 4 to 8%.

Any method may be used to adjust the ratio of the volume VB occupied by the skeleton part 2 to the apparent volume VS of the skeleton part 2. For example, there is a method of adjusting the thickness (cross-sectional area) of some or all of the bones 2B constituting the skeleton part 2 and/or the size (cross-sectional area) of some or all of the coupling parts J constituting the skeleton part 2.

In each example described in the present specification, the 25% hardness of the porous structural body 1 is preferably 60 to 500 N, and more preferably 100 to 450 N. The 25% hardness (N) of the porous structural body 1 shall be a measurement value obtained by measuring a load (N) required to compress the porous structural body by 25% at 23° C. and 50% relative humidity using an Instron-type compression testing machine. This allows the hardness of the porous structural body 1 to be favorable as a cushioning material, for example, as a seat pad (in particular, a car seat pad).

As illustrated in FIGS. 1 to 4, in the present example, the skeleton part 2 includes a plurality (the same number of the cell holes C) of cell zoning parts 21 that zone the cell hole C inside.

Figure 3:
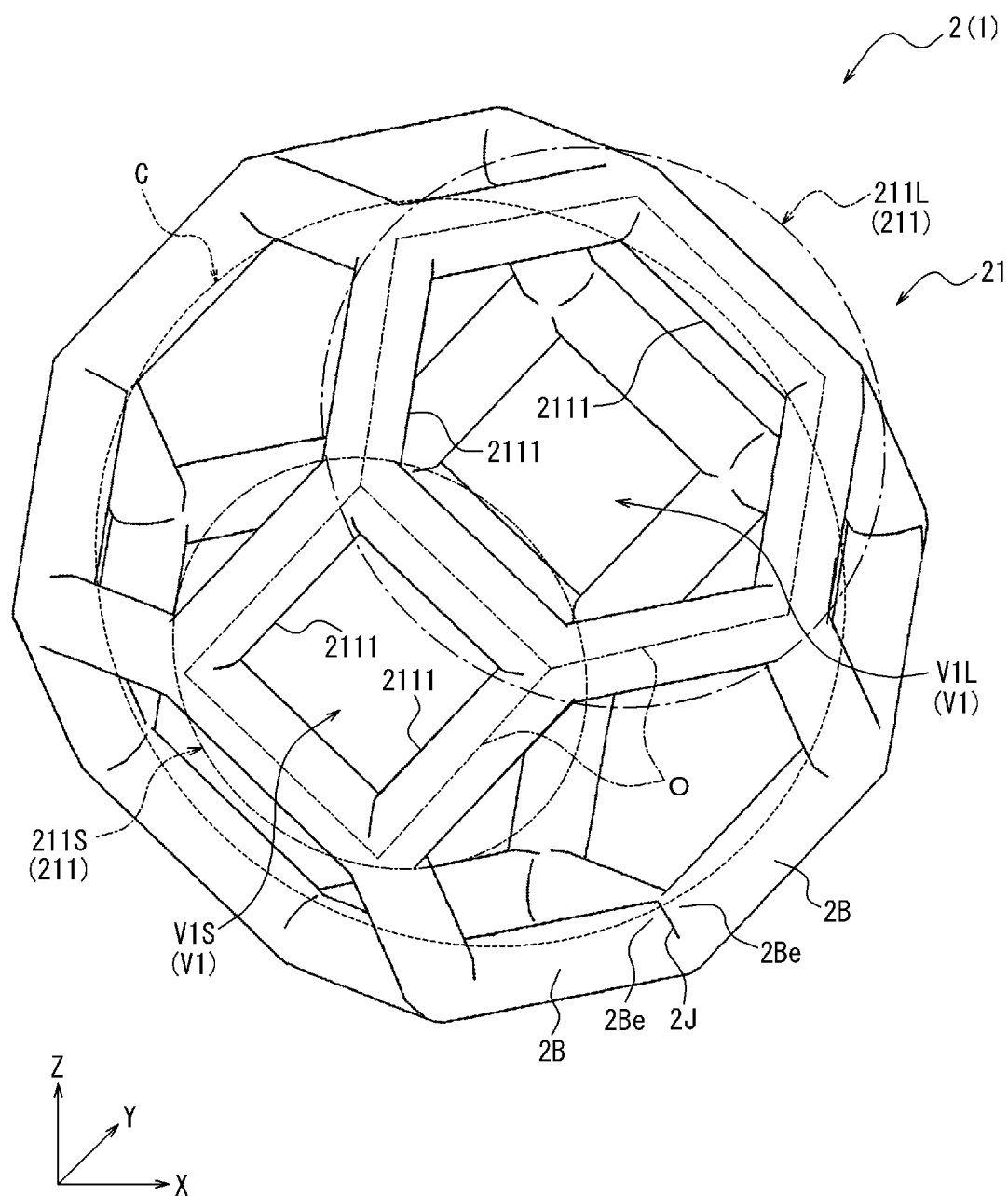
FIG. 3 is a perspective view illustrating a cell zoning part of the porous structural body in FIG. 1, in a state of omitting partially connected films.
Figure 4:
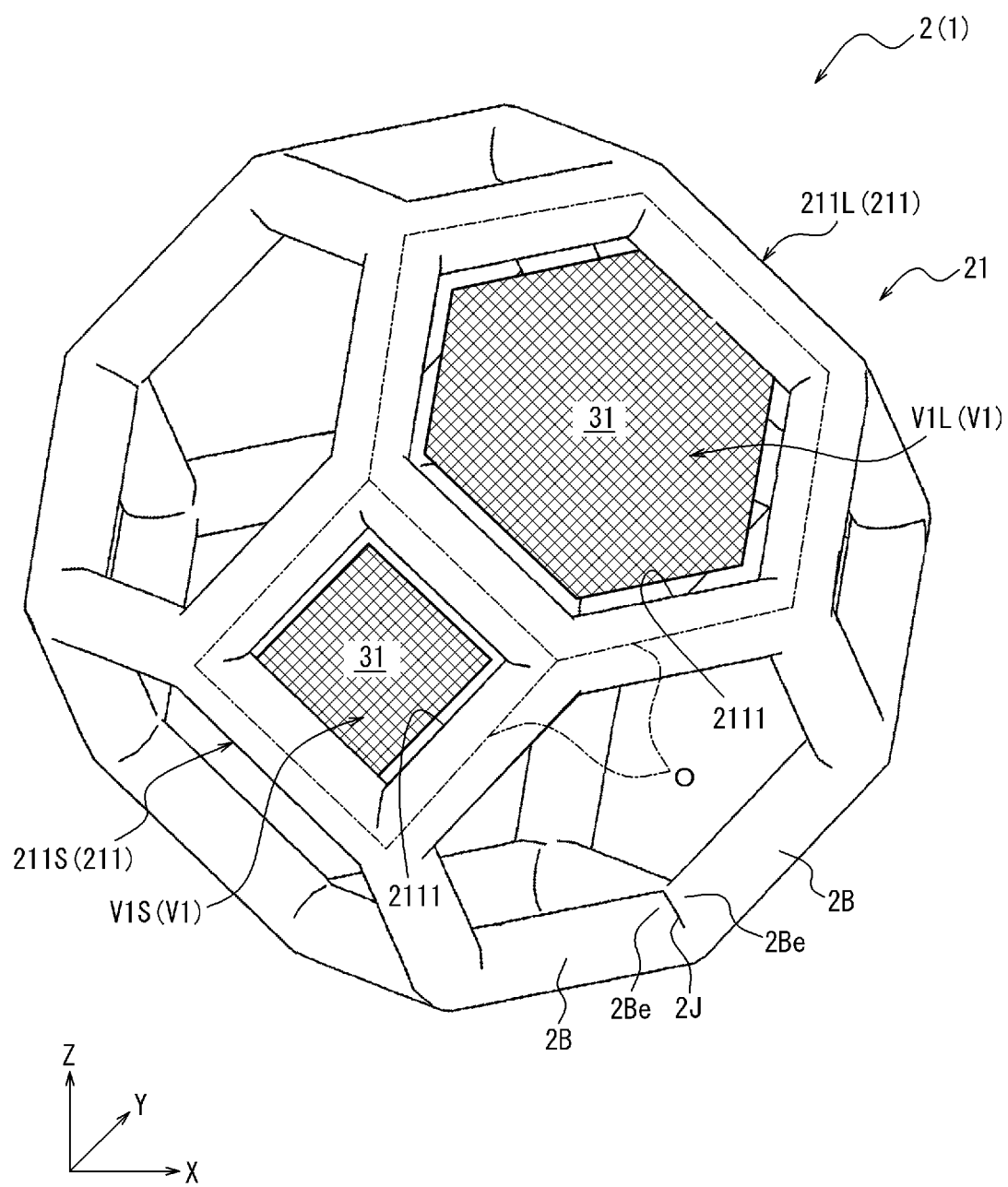
FIG. 4 is a perspective view illustrating the cell zoning part of the porous structural body in FIG. 1, in a state of illustrating partially connected films.

FIGS. 3 and 4 illustrate one cell zoning part 21 alone. In FIG. 3, partially connected films 31 are omitted for the sake of convenience, whereas the partially connected films 31 are illustrated in FIG. 4. The skeleton part 2 of the present example has such a structure that a large number of cell zoning parts 21 are linked in a row in each of X-, Y-, and Z-directions.

As illustrated in FIGS. 1 to 4, each cell zoning part 21 includes a plurality of (14, in the present example) annular parts 211. Each annular part 211 has an annular shape, and zones an approximately flat virtual surface V1 by its annular inner peripheral side edge parts 2111. The virtual surface V1 is a virtual plane (i.e., virtual closed plane) zoned by the inner peripheral side edge parts 2111 of the annular part 211. The plurality of annular parts 211 constituting the cell zoning part 21 are connected to each other such that the virtual surfaces V1 zoned by the respective inner peripheral side edge parts 2111 do not intersect with each other. Note that, as for the virtual surface V1, "approximately flat" is not limited to the case of being strictly flat, but is sufficient if it is substantially flat, including the case of a curved surface, for example.

The cell hole C is zoned by the plurality of annular parts 211 constituting the cell zoning part 21, and the plurality of virtual surfaces V1 zoned by the plurality of respective annular parts 211. Schematically, the annular part 211 is a portion that zones sides of the three-dimensional shape of the cell hole C, and the virtual surface V1 is a portion that zones a constituent face of the three-dimensional shape of the cell hole C.

Each annular part 211 is constituted of a plurality of bone parts 2B and a plurality of coupling parts 2J that couple end parts 2Be of the plurality of bone parts 2B with each other.

A connection portion of a pair of annular parts 211 connected to each other is constituted of one bone part 2B and a pair of coupling parts 2J at both sides thereof, which are shared by the pair of annular parts 211. That is, each bone part 2B and each coupling part 2J are shared by the plurality of adjacent annular parts 211.

For each virtual surface V1, a surface of the virtual surface V1 (a front surface of the virtual surface V1) on one side zones part of a cell hole C, and a surface of the virtual surface V1 (a back surface of the virtual surface V1) on the other side zones part of another cell hole C. In other words, both the front and back surfaces of each virtual surface V1 zone parts of the different cell holes C from each other. Further, in other words, each virtual surface V1 is shared by a pair of cell holes C adjacent to the virtual surface V1 (i.e., a pair of cell holes C sandwiching the virtual surface V1 therebetween).

Also, each annular part 211 is shared by a pair of cell zoning parts 21 adjacent to the annular part 211 (i.e., a pair of cell zoning parts 21 sandwiching the annular part 211 therebetween). In other words, each annular part 211 serves as a part of each of a pair of cell zoning parts 21 adjacent to each other.

In the example of FIGS. 1 and 2, some virtual surfaces V1 in the porous structural body 1 are not covered with the partially connected films 31 (FIG. 4) but are opened, in other words, form openings. Thus, the cell holes C communicate with each other through the virtual surfaces V1 to allow ventilation between the cell holes C. Accordingly, breathability of the skeleton part 2 can be improved, and the compressive and restorative deformation of the skeleton part 2 in response to the application and release of external force can be easily performed.

As illustrated in FIG. 3, in the present example, the skeleton lines O of the respective cell zoning parts 21 form a polyhedral shape, and hence, the respective cell holes C form an approximately polyhedral shape. More specifically, in the example of FIGS. 1 to 4, the skeleton lines O of the respective cell zoning parts 21 form a Kelvin's tetradecahedral (truncated octahedral) shape, and hence, the respective cell holes C form an approximately Kelvin's tetradecahedral (truncated octahedral) shape. The Kelvin's tetradecahedron (truncated octahedron) is a polyhedron constituted of six square constituent faces and eight regular hexagonal constituent faces. Schematically, the cell holes C constituting the skeleton part 2 are regularly arrayed to spatially fill an internal space surrounded by an outer edge (outer contour) of the skeleton part 2 (i.e., so that the respective cell holes C are paved without any wasted gaps, further in other words, to make gaps (intervals) between the cell holes C small).

When the shapes of the skeleton lines O of some or all (all, in the present example) cell zoning parts 21 of the skeleton part 2 (i.e., the shapes of some or all (all, in the present example) cell holes C of the skeleton part 2) are polyhedral as in the present example, gaps (intervals) between the cell holes C constituting the skeleton part 2 can be smaller, and a larger number of cell holes C can be formed inside the skeleton part 2. Also, with this configuration, behavior of the compressive and restorative deformation of the skeleton part 2 (i.e., the porous structural body 1) in response to the application and release of external force is more favorable as a cushion member, for example, as a seat pad (in particular, as a car seat pad).

The polyhedron shape formed by the skeleton lines O of the cell zoning part 21 (i.e., the polyhedron shape formed by the cell holes C) is not limited to the present example and may be optional. For example, a configuration in which the shape of the skeleton lines O of the cell zoning part 21 (i.e., the shape formed by the cell holes C) is an approximately tetrahedral, approximately octahedral, or approximately dodecahedral is preferable from the viewpoint of making gaps (intervals) between the cell holes C small. Alternatively, the shape of the skeleton lines O of some or all cell zoning parts 21 of the skeleton part 2 (i.e., the shape formed by some or all cell holes C of the skeleton part 2) may be a three-dimensional shape other than an approximately polyhedral shape (e.g., a sphere, an ellipsoid, a cylinder, or the like). Also, the skeleton part 2 may include, as the cell zoning parts 21, only a type of cell zoning parts 21 having the skeleton lines O with the same shape or may include a plurality of types of cell zoning parts 21 having the skeleton lines O with different shapes. Similarly, the skeleton part 2 may include, as the cell holes C, only a type of cell holes C having the same shape, or may include a plurality of types of cell holes C having different shapes. Note that, when the shape of the skeleton lines O of the cell zoning part 21 (i.e., the shape of the cell holes C) is approximately Kelvin's tetradecahedral (truncated octahedral) as in the present example, the cushion member can have most easily produced characteristics equivalent to those of typical polyurethane foam, which is manufactured through a process of foaming by chemical reaction, as compared to another shape.

As illustrated in FIGS. 1 to 4, in the present example, the plurality of (14, in the present example) annular parts 211 constituting each cell zoning part 21 includes one or a plurality of (6, in the present example) small annular parts 211S and one or a plurality of (8, in the present example) large annular parts 211L. Each small annular part 211S zones, by its annular inner peripheral side edge parts 2111, a small virtual surface V1S that is approximately flat. Each large annular part 211L zones, by its annular inner peripheral side edge parts 2111, a large virtual surface V1L that is approximately flat and has a larger area than that of the small virtual surface V1S. Each of the small virtual surface V1S and the large virtual surface V1L is a virtual plane (that is, virtual closed plane). Note that, as for the small virtual surface VIS and the large virtual surface V1L, "approximately flat" is not limited to the case of being strictly flat, but is sufficient if it is substantially flat, including the case of a curved surface, for example.

As is apparent from FIG. 3, in the present example, the skeleton lines O of the large annular part 211L form a regular hexagonal shape, and accordingly, the corresponding large virtual surface V1L also has an approximately regular hexagonal shape. Also, in the present example, the skeleton lines O of the small annular part 211S form a square shape, and accordingly, the corresponding small virtual surface V1S also has an approximately square shape. Thus, in the present example, the small virtual surface V1S and the large virtual surface V1L are different from each other not only in area but also in shape.

Each large annular part 211L is constituted of a plurality of (6, in the present example) bone parts 2B and a plurality of (6, in the present example) coupling parts 2J coupling end parts 2Be of the plurality of bone parts 2B with each other. Each small annular part 211S is constituted of a plurality of (4, in the present example) bone parts 2B and a plurality of (4, in the present example) coupling parts 2J coupling end parts 2Be of the plurality of bone parts 2B with each other.

In the example of FIGS. 1 to 4, the skeleton lines O of each of a plurality of cell zoning parts 21 constituting the skeleton part 2 form a Kelvin's tetradecahedral (truncated octahedral) shape. As described above, the Kelvin's tetradecahedron (truncated octahedron) is a polyhedron constituted of six square constituent faces and eight regular hexagonal constituent faces. Accordingly, the cell holes C zoned by each cell zoning part 21 form an approximately Kelvin's tetradecahedral shape. The skeleton lines O of the plurality of cell zoning parts 21 constituting the skeleton part 2 are connected to each other so as to fill a space. In other words, there is no gap between the skeleton lines O of the plurality of cell zoning parts 21.

Thus, in the present example, the skeleton lines O constituting each of the plurality of cell zoning parts 21 of the skeleton part 2 are polyhedral (Kelvin's tetradecahedral, in the present example), and accordingly, the cell holes C form an approximately polyhedral (Kelvin's tetradecahedral, in the present example) shape, so that the gaps (intervals) between the cell holes C constituting the porous structural body 1 can be smaller, and a larger number of cell holes C can be formed inside the porous structural body 1. Also, with this configuration, behavior of the compressive and restorative deformation of the porous structural body 1 in response to the application and release of external force is more favorable as a cushion member, for example, as a seat pad (in particular, as a car seat pad). Note that, the gaps (intervals) between the cell holes C correspond to flesh parts (bone parts 2B or coupling parts 2J) of the skeleton part 2 that zones the cell holes C.

In the present example, the skeleton lines O of the plurality of cell zoning parts 21 constituting the skeleton part 2 are connected to each other so as to fill a space, so that the gaps (intervals) between the cell holes C constituting the porous structural body 1 can be made smaller. Thus, the characteristics of the porous structural body as a cushioning material can be improved.

The polyhedrons formed by the skeleton lines O of the cell zoning part 21 (and thus, the approximate polyhedron formed by the cell holes C) can be any, not limited to the example in each figure.

For example, the polyhedrons formed by the skeleton lines O of the plurality of cell zoning parts 21 constituting the skeleton part 2 (and thus, the polyhedrons formed by the cell holes C) can be preferably space-filled (arranged without gaps). This allows the skeleton lines O of the plurality of cell zoning parts 21 constituting the skeleton part 2 to be connected to each other in a space-filling manner, thereby improving the characteristics of the porous structural body as a cushioning material. In this case, the polyhedrons formed by the skeleton lines O of the plurality of cell zoning parts 21 constituting the skeleton part 2 (and thus, the approximate polyhedron formed by the cell holes C) may include only one type of polyhedrons, as in the present example, or may include a plurality of types of polyhedrons. Here, with respect to the polyhedrons, "type" refers to a shape (the number and shape of constituent faces), and specifically means that two polyhedrons with different shapes (the number and shape of constituent faces) are treated as two different types of polyhedrons, while two polyhedrons with the same shape but different dimensions are treated as the same type of polyhedrons. Examples of such polyhedrons when the polyhedrons formed by the skeleton lines O of the plurality of cell zoning parts 21 constituting the skeleton part 2 can be space-filling and include only one type of polyhedrons include a regular triangular prism, regular hexagonal prism, cube, rectangle, rhombic dodecahedron, and the like, as well as a Kelvin's tetradecahedron (truncated octahedron). As illustrated in the example in each figure, when the shape of the skeleton lines O of the cell zoning part 21 is a Kelvin's tetradecahedron (truncated octahedron), as compared to other shapes, it is easiest to reproduce the characteristics of a cushioning material equivalent to general polyurethane foam manufactured through a process of foaming by chemical reaction. When the shape of the skeleton lines O of the cell zoning part 21 is a Kelvin's tetradecahedron (truncated octahedron), it is possible to obtain equal mechanical characteristics in each of the X-, Y-, and Z-directions. Examples of such polyhedrons when the polyhedrons formed by the skeleton lines O of the plurality of cell zoning parts 21 constituting the skeleton part 2 can be space-filling and include a plurality of types of polyhedrons include the combination of a regular tetrahedron and a regular octahedron, the combination of a regular tetrahedron and a truncated tetrahedron, the combination of a regular octahedron and a truncated hexahedron, and the like. Note that, although these are examples of combinations of two types of polyhedrons, combinations of three or more types of polyhedrons are also possible.

The polyhedrons formed by the skeleton lines O of the plurality of cell zoning parts 21 constituting the skeleton part 2 (and thus, the approximate polyhedrons formed by the cell holes C) can be, for example, any regular polyhedron (a convex polyhedron whose all faces are congruent regular polygons and the number of tangent faces is equal at all vertices), a semi-regular polyhedron (a convex polyhedron whose all faces are regular polygons and all vertex shapes are congruent (the type and order of regular polygons gathered at the vertices are the same), except regular polyhedrons), a prism, a pyramid, or the like.

The skeleton lines O of some or all cell zoning parts 21 of the plurality of cell zoning parts 21 constituting the skeleton part 2 may have a three-dimensional shape other than a polyhedron (e.g., sphere, oval, cylinder, or the like). Thus, some or all cell holes C of the plurality of cell holes C constituting the skeleton part 2 may have an approximately three-dimensional shape other than an approximate polyhedron (e.g., an approximate sphere, oval, cylinder, or the like).

Since the plurality of annular parts 211 constituting the cell zoning part 21 include the small annular parts 211S and the large annular parts 211L having different sizes, gaps (intervals) between the cell holes C constituting the skeleton part 2 can be smaller. Moreover, when the shapes of the small annular part 211S and the large annular part 211L are different from each other as in the present example, gaps (intervals) between the cell holes C constituting the skeleton part 2 can be further smaller.

However, the plurality of annular parts 211 constituting the cell zoning part 21 may have the same size and/or shape. When the respective annular parts 211 constituting the cell zoning part 21 have the same size and shape, the same mechanical characteristics can be obtained in the respective X-, Y- and Z-directions.

As in the present example, since the skeleton lines O of some or all (all, in the present example) annular parts 211, out of the respective annular parts 211 constituting the cell zoning part 21, (i.e., some or all (all, in the present example) virtual surfaces V1, out of the respective virtual surfaces V1 constituting the cell zoning part 21) have approximately polygonal shapes, intervals between the cell holes C constituting the skeleton part 2 can be smaller. Moreover, the behavior of compressive and restorative deformation of the skeleton part 2 in response to the application and release of external force is more favorable as a cushion member for a seat part, in particular, as a car seat pad. Since the shapes of the annular parts 211 (i.e., the shapes of the virtual surfaces V1) are made simple, manufacturability and characteristic adjustment easiness can be improved. Note that, the same effects can be obtained to some different extent when at least one annular part 211 of the respective annular parts 211 constituting the skeleton part 2 (i.e., at least one virtual surface V1 of the respective virtual surfaces V1 constituting the skeleton part 2) satisfies the above-described configuration.

Note that the skeleton lines O of at least one annular part 211 of the respective annular parts 211 included in the skeleton part 2 (i.e., at least one virtual surface V1 of the respective virtual surfaces V1 included in the skeleton part 2) may form any approximately polygonal shape other than an approximately regular hexagonal shape or an approximately square shape as in the present example, or form a planar shape (e.g., a circle (such as a perfect circle, an ellipse, or the like)) other than the approximately polygonal shape. When the shape of the skeleton lines O of the annular part 211 (i.e., the shape of the virtual surface V1) is a circle (a perfect circle, an ellipse, or the like), the shape of the annular part 211 (i.e., the shape of the virtual surface V1) is made simple. Therefore, the manufacturability and characteristic adjustment easiness can be improved, and more homogenous mechanical characteristics can be obtained. For example, when the shape of the skeleton lines O of the annular part 211 (i.e., the shape of the virtual surface V1) is an ellipse (horizontally long ellipse) that is long in a direction approximately perpendicular to the direction of weight application, the annular part 211, i.e., the skeleton part 2 (i.e., the porous structural body 1) easily deforms (softens) in response to input of force, as compared to a case in which the shape is an ellipse (vertically long ellipse) that is long in a direction approximately parallel to the direction of weight application.

In the present example, it is preferable that the skeleton part 2 includes at least one cell hole C having a diameter of 5 mm or larger. Accordingly, the porous structural body 1 can be easily manufactured using the 3D printer. When the diameter of each cell hole C of the skeleton part 2 is smaller than 5 mm, the structure of the skeleton part 2 is so complicated that it is potentially difficult to generate, on a computer, three-dimensional shape data (such as CAD data) representing the three-dimensional shape of the porous structural body 1 or 3D shaping data generated based on the three-dimensional shape data.

Note that, since a porous structural body that is configured as a conventional cushion member is manufactured through a process of foaming by chemical reaction, it is not easy to form cell holes C having diameters of 5 mm or larger.

In addition, since the skeleton part 2 includes the cell holes C having diameters of 5 mm or larger, the breathability and deformation easiness of the skeleton part 2 can be easily improved.

From these points of view, the diameters of all the cell holes C constituting the skeleton part 2 are preferably 5 mm or larger.

As the diameters of the cell holes C increase, the porous structural body 1 can be more easily manufactured using the 3D printer and the breathability and deformation easiness can be more easily improved. From these points of view, the diameter of at least one cell hole C (preferably, all the cell holes) in the skeleton part 2 is preferably 8 mm or larger, and more preferably 10 mm or larger.

On the other hand, when the cell holes C in the skeleton part 2 are too large, it is difficult to neatly (smoothly) form the outer edge (outer contour) shape of the skeleton part 2 (i.e., the porous structural body 1), which potentially leads to decreased shaping accuracy and degraded appearance of a cushion member (for example, seat pad, in particular, car seat pad). In addition, characteristics as the cushion pad (for example, seat pad, in particular, car seat pad) may not be sufficiently favorable. Thus, to improve the appearance and characteristics as the cushion pad (for example, seat pad, in particular, car seat pad), the diameter of each cell hole C in the skeleton part 2 is preferably smaller than 30 mm, more preferably 25 mm or smaller, even more preferably 20 mm or smaller.

Note that, the more cell holes C in the porous structural body 1 that satisfy the above numerical range of diameters, the easier it is to obtain each of the above effects. From this viewpoint, the diameter of each cell hole C constituting the porous structural body 1 preferably satisfies at least one of the above numerical ranges. Similarly, it is more preferable that the average value of the diameters of the respective cell holes C constituting the porous structural body 1 satisfies at least one of the above numerical ranges.

Note that, the diameter of the cell hole C is the diameter of a circumscribed sphere of the cell hole C when the cell hole C has a shape different from a perfectly spherical shape as in the present example.

When the cell holes C in the skeleton part 2 are too small, the structure of the skeleton part 2 becomes too complicated. As a result, it may be difficult to generate, on the computer, the three-dimensional shape data (such as the CAD data) representing the three-dimensional shape of the porous structural body 1 or the 3D shaping data to be generated based on the three-dimensional shape data, and therefore it is difficult to manufacture the porous structural body 1 using the 3D printer. To facilitate manufacturing the porous structural body 1 using the 3D printer, the diameter of a cell hole C with a smallest diameter, out of the respective cell holes C constituting the skeleton part 2, is preferably 0.05 mm or larger, more preferably 0.10 mm or larger. The shaping can be performed at the resolution of a high-performance 3D printer when the diameter of the cell hole C with the smallest diameter is 0.05 mm or larger, and the shaping can be performed not only at the resolution of the high-performance 3D printer but also at the resolution of a general-purpose 3D printer when the diameter of the cell hole C with the smallest diameter is 0.10 mm or larger.

As described above, as illustrated in FIGS. 1, 2, and 4, the porous structural body 1 has one or a plurality of partially connected films 31, in addition to the skeleton part 2. Each of one or a plurality of virtual surfaces V1, out of the respective constituent faces V1 constituting the skeleton part 2, is at least partially covered with the one or plurality of partially connected films 31. As illustrated enlarged in FIG. 5, each of the one or plurality of partially connected films 31 is connected to only a part of the annular part 211 in a peripheral direction. Specifically, each of the partially connected films 31 is connected to only a part of the annular inner peripheral side edge parts 2111 of the annular part 211 in the peripheral direction. The partially connected film 31 is structured integrally with the skeleton part 2.

Each partially connected film 31 extends over the virtual surface V1 zoned by the inner peripheral side edge parts 2111 of the annular part 211, thereby covering at least a part of the virtual surface V1 zoned by the annular part 211.

Figure 5:
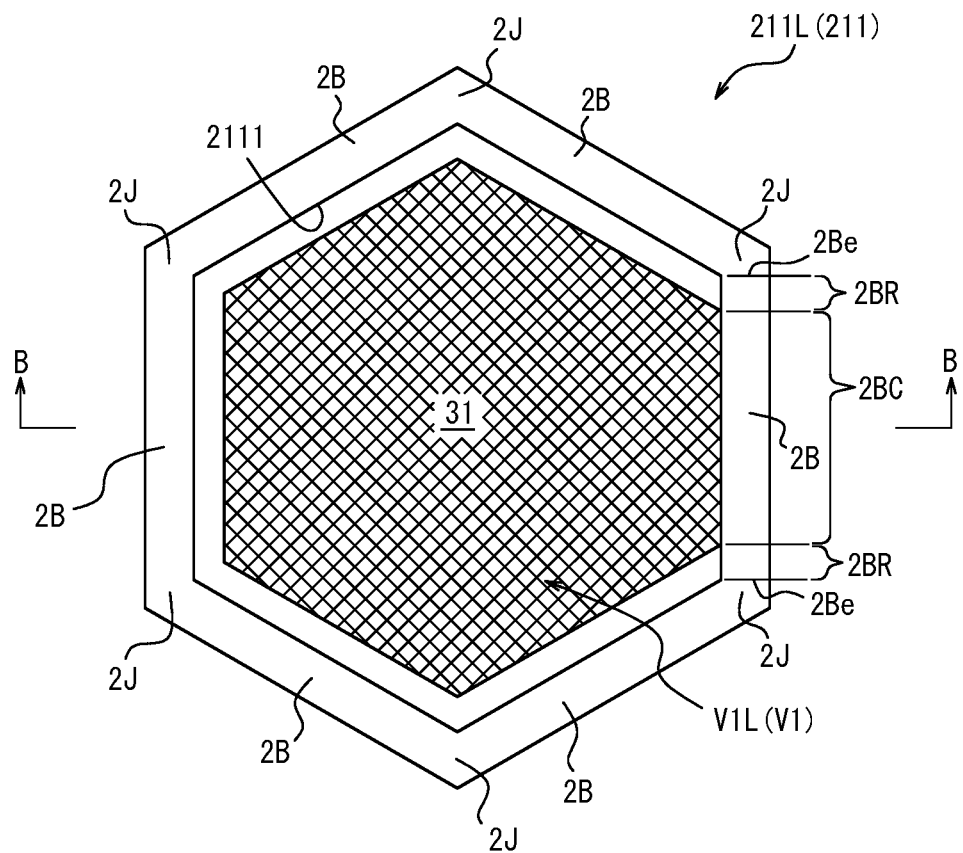
FIG. 5 is a plan view illustrating an annular part and a partially connected film in FIG. 4.
Figure 6:
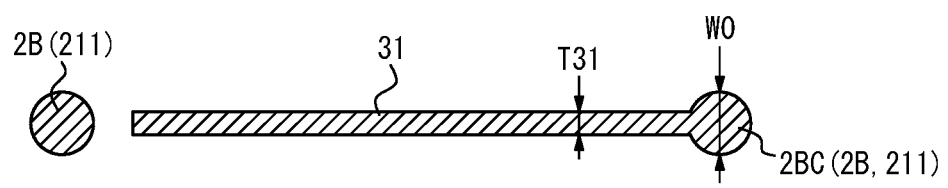
FIG. 6 is a B-B cross-sectional view illustrating the annular part and the partially connected film in FIG. 5 in a cross section along line B-B in FIG. 5.
Figure 7:
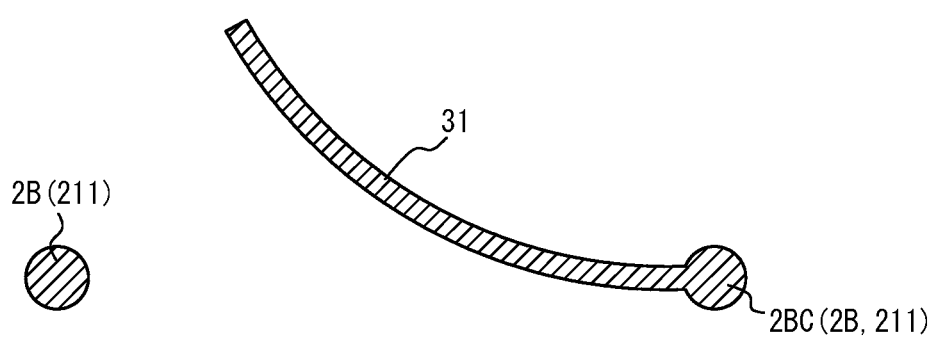
FIG. 7 is a cross-sectional view illustrating the annular part and the partially connected film in FIG. 6 in a state in which the porous structural body is compressively or restoratively deformed.

FIG. 6 is a B-B cross-sectional view of the annular part 211 and partially connected film 31, illustrated by a cross section along line B-B in FIG. 5. FIG. 6 illustrates the annular part 211 and partially connected film 31 in a natural state when no external force is applied to the porous structural body 1. FIG. 7 is a cross-sectional view in a position corresponding to FIG. 6, illustrating the annular part 211 and partially connected film 31 in a state in which the porous structural body 1 is compressively or restoratively deformed. As illustrated in FIGS. 6 and 7, the partially connected film 31 is connected to only a part of the annular part 211 in the peripheral direction, so when the porous structural body 1 is compressively or restoratively deformed by application of external force (FIG. 7), a part of the partially connected film 31 that is not connected to the annular part 211 is pushed by air and warps. The air passes through a gap between the partially connected film 31 and the annular part 211 that is formed at this time. In this way, ventilation between the two cell holes C that sandwich the virtual surface V1 covered with the partially connected film 31 is realized. A flow of air in and out of the gap between the partially connected film 31 and the annular part 211 and the deformation operation of the partially connected film 31 and the annular part 211 during the compressive or restorative deformation of the porous structural body 1 affect the dynamic properties of the porous structural body 1, specifically vibration damping properties (in particular, viscous damping properties). By adjusting the structure of the partially connected film 31 and annular part 211, the operation of air flowing in and out of the gap between the partially connected film 31 and the annular part 211 and the deformation operation of the partially connected film 31 and the annular part 211 can be adjusted, which in turn enables the realization of more varied dynamic properties (specifically, vibration damping properties (in particular, viscous damping properties)) according to requirements. Thus, the degree of freedom in adjusting the dynamic properties of the porous structural body 1 can be increased. This is particularly favorable when the porous structural body 1 is used in vehicle seat pads, in particular, car seat pads that are subject to vibration input during use.

As described above, a conventional porous structural body constituting a cushioning material is manufactured through a process of foaming by chemical reaction, and hence is difficult to form films in connecting holes connecting cells in expected positions, number, sizes, and shapes. When the porous structural body 1 is manufactured using the 3D printer, as in the present example, 3D modeling data loaded into the 3D printer includes information on the partially connected films 31 in advance, making it possible to reliably form the partially connected films 31 in desired positions, number, sizes, and shapes.

In addition to the porous structural body 1 according to the first embodiment of the present disclosure illustrated in FIGS. 1 to 7, porous structural bodies 1 according to second to eighth embodiments of the present disclosure illustrated in FIGS. 8 to 14 will be described below.

In the porous structural bodies 1 according to the second to eighth embodiments illustrated in FIGS. 8 to 14, similar to the porous structural body 1 according to the first embodiment, the porous structural body 1 includes one or a plurality of partially connected films 31, in addition to a skeleton part 2. Each of one or a plurality of virtual surfaces V1, out of respective virtual surfaces V1 constituting the skeleton part 2, is covered with the one or plurality of partially connected films 31 at least at a part thereof. Each of the one or plurality of partially connected films 31 is connected to only a part of the annular part 211 in a peripheral direction. Therefore, the porous structural bodies 1 according to the second to eighth embodiments also have the same effects as the porous structural body 1 according to the first embodiment.

Figure 8:
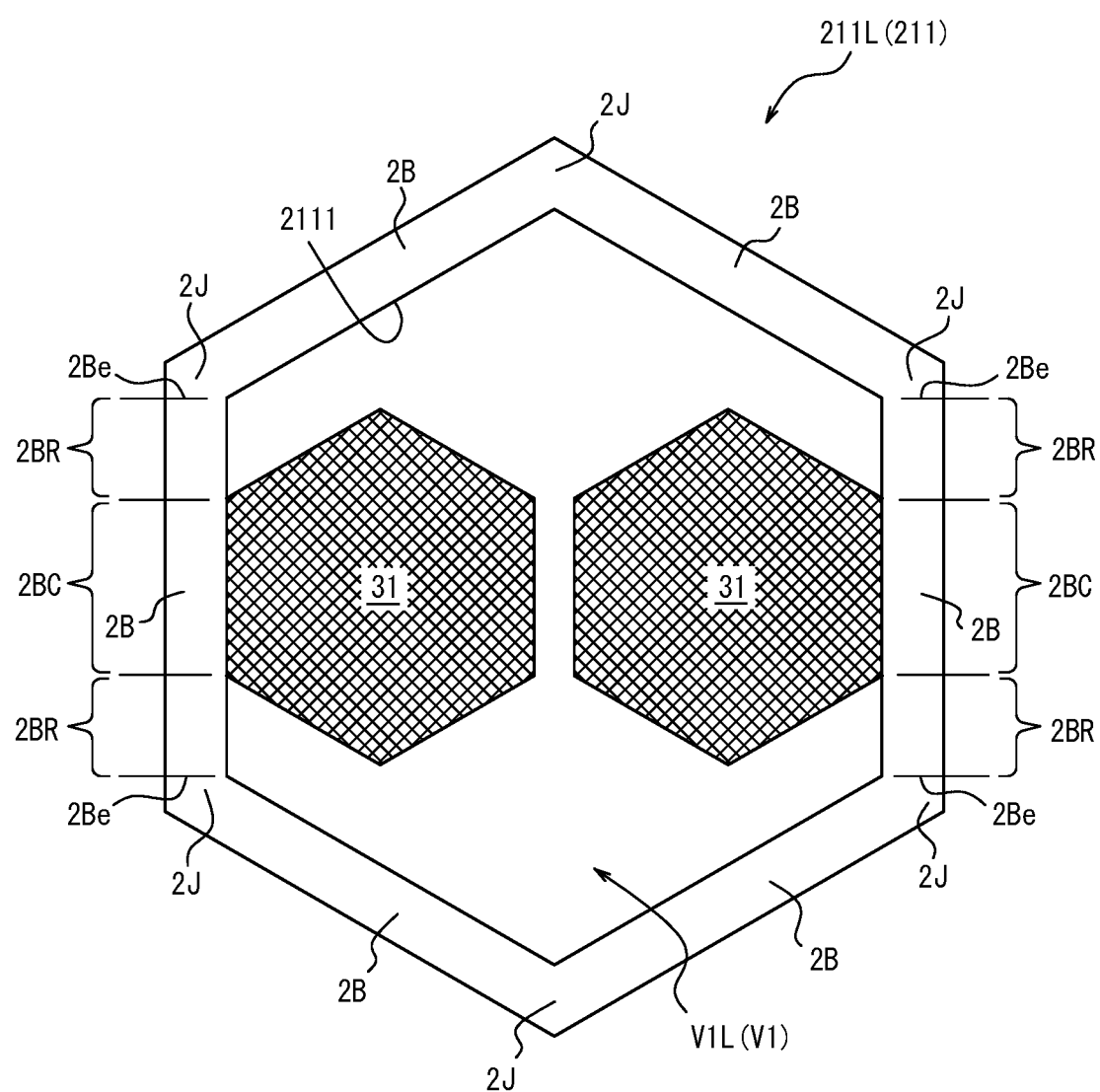
FIG. 8 is a diagram corresponding to FIG. 5, and is a plan view illustrating an annular part and partially connected films of a porous structural body according to a second embodiment of the present disclosure.
Figure 10:
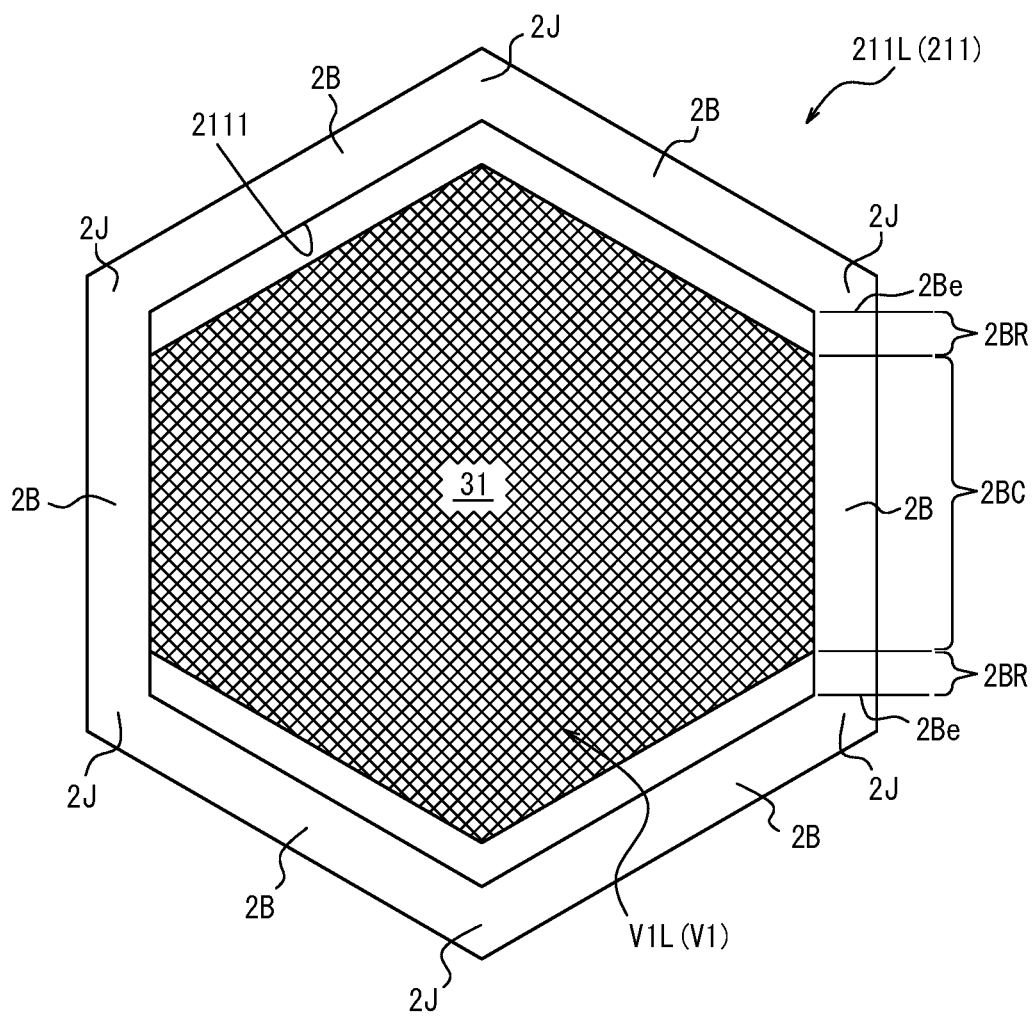
FIG. 10 is a diagram corresponding to FIG. 5, and is a plan view illustrating an annular part and a partially connected film of a porous structural body according to a fourth embodiment of the present disclosure.
Figure 11:
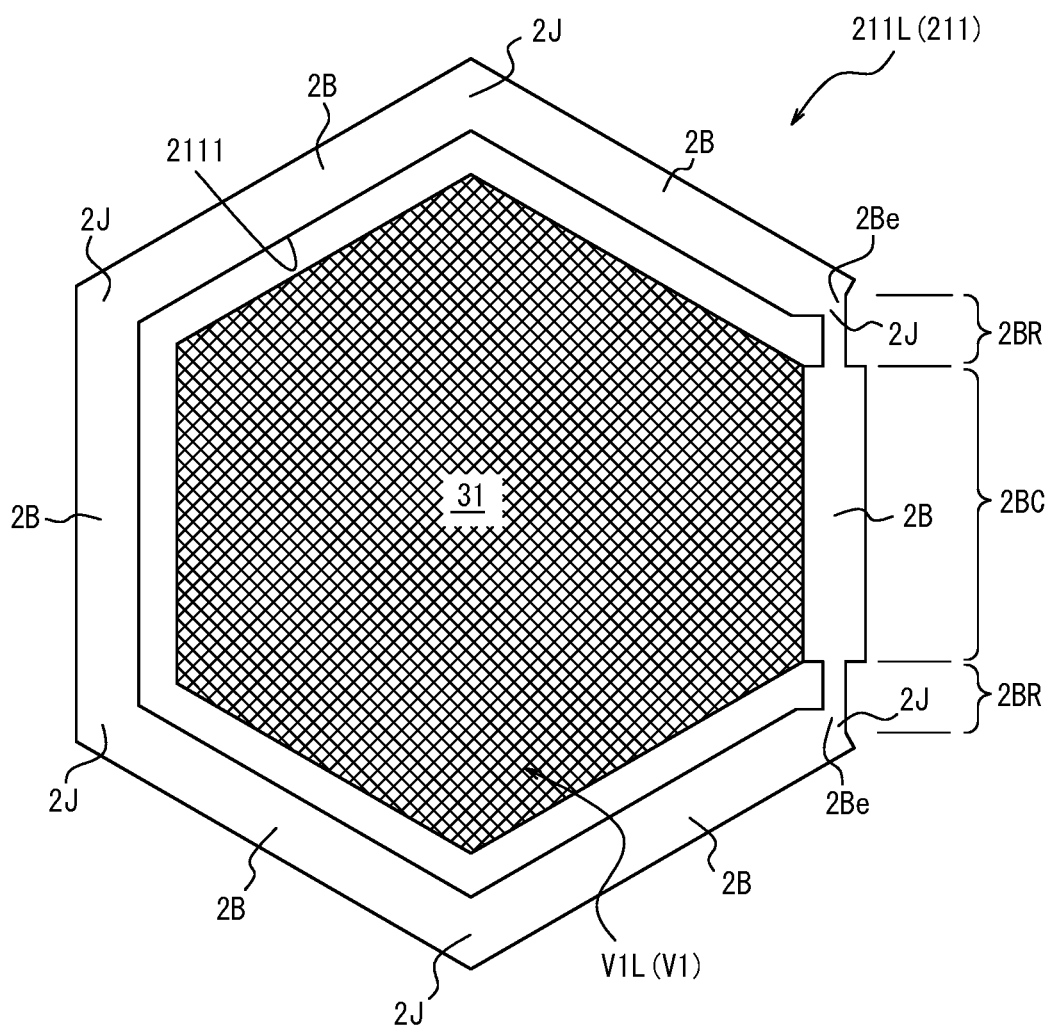
FIG. 11 is a diagram corresponding to FIG. 5, and is a plan view illustrating an annular part and a partially connected film of a porous structural body according to a fifth embodiment of the present disclosure.
Figure 12:
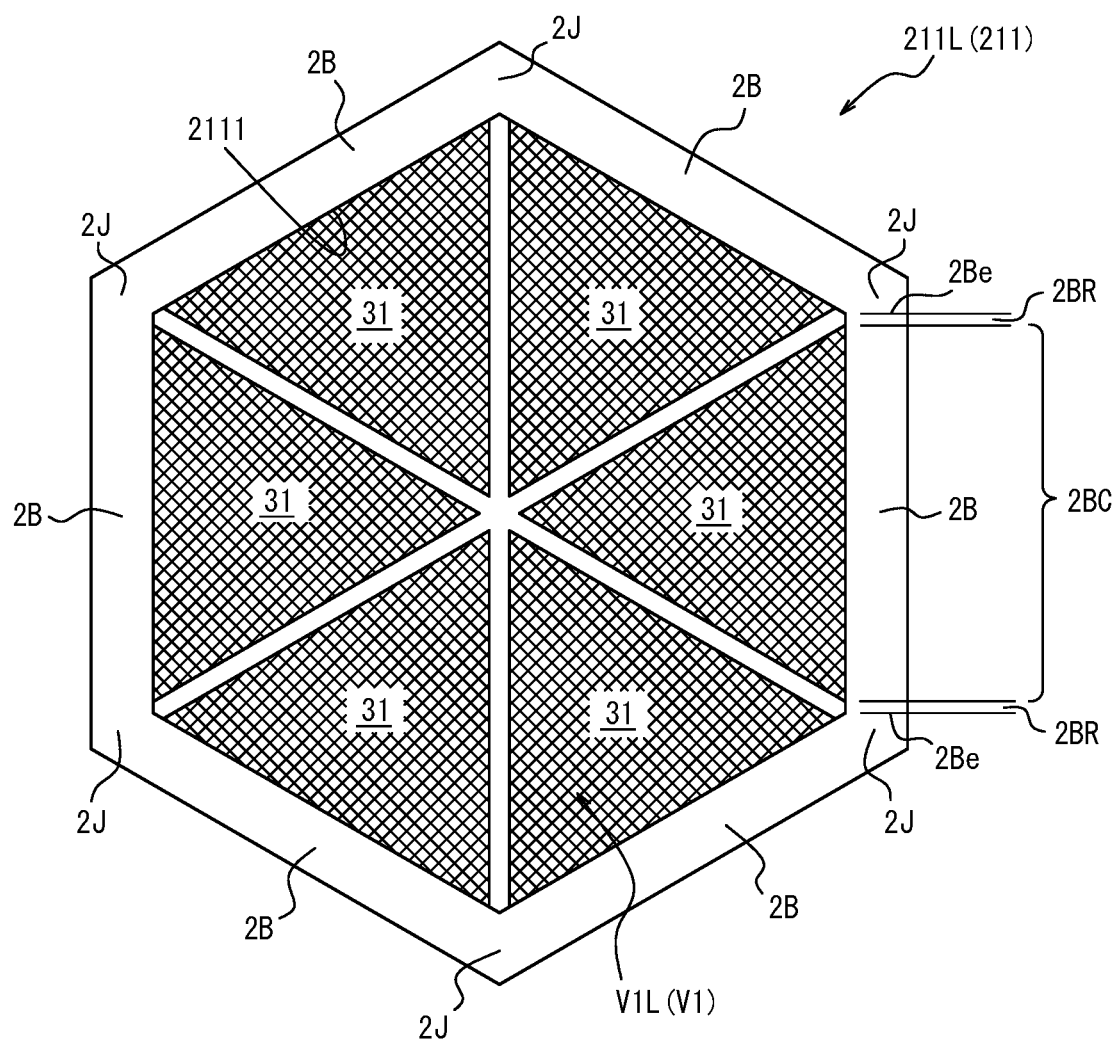
FIG. 12 is a diagram corresponding to FIG. 5, and is a plan view illustrating an annular part and partially connected films of a porous structural body according to a sixth embodiment of the present disclosure.
Figure 13:
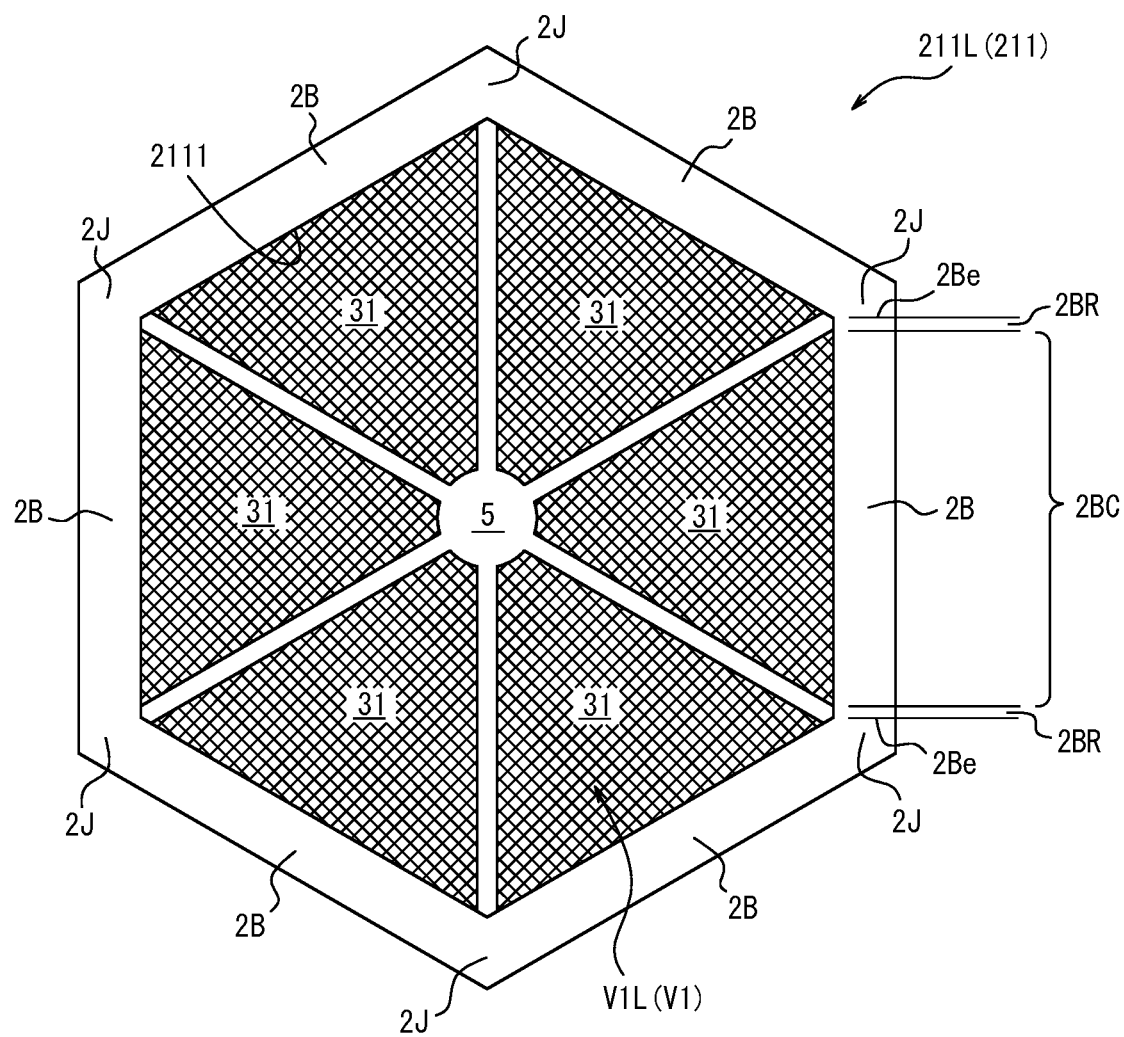
FIG. 13 is a diagram corresponding to FIG. 5, and is a plan view illustrating an annular part and partially connected films of a porous structural body according to a seventh embodiment of the present disclosure.

In each of the embodiments described in the present specification, each of the one or plurality of the virtual surfaces V1, out of the respective virtual surfaces V1 constituting the skeleton part 2, may be covered with only one partially connected film 31, as in each of the embodiments of FIGS. 5, 9 to 11, or may be covered with a plurality of partially connected films 31, as in each of the embodiments of FIGS. 8 and 12 to 13. When the virtual surface V1 is covered with a plurality of partially connected films 31, it is suitable that these plurality of partially connected films 31 do not overlap each other in plan view, as in each of the embodiments of FIGS. 8 and 12 to 13.

By adjusting the number and size of the partially connected films 31 covering the virtual surface V1, the operation of air flowing in and out of the gaps between the partially connected films 31 and the annular part 211 and the deformation operation of the partially connected films 31 can be adjusted, and thus the dynamic properties (specifically, vibration damping properties (in particular, viscous damping properties)) can be adjusted.

Figure 9:
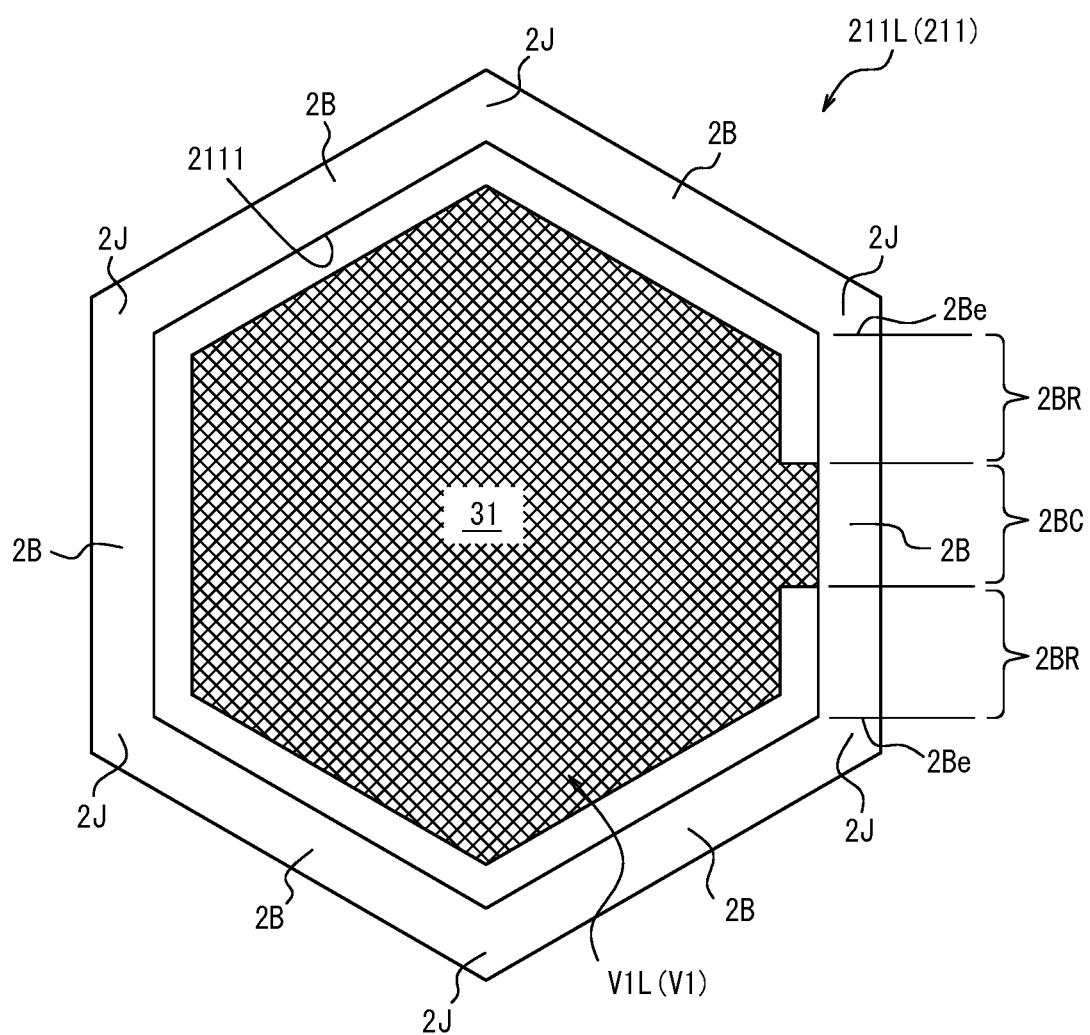
FIG. 9 is a diagram corresponding to FIG. 5, and is a plan view illustrating an annular part and a partially connected film of a porous structural body according to a third embodiment of the present disclosure.

In each of the embodiments described in the present specification, each of the one or plurality of partially connected films may be connected to only a part of the annular part 211 in the peripheral direction, as in each of the embodiments of FIGS. 5, 8 to 9, and 11 to 13, or may be connected to a plurality of parts (two parts in the example of FIG. 10) of the annular part 211 in the peripheral direction, as in the example of FIG. 10.

By adjusting the number and position of connection portions between the partially connected film 31 and the annular part 211, the operation of air flowing in and out of the gap between the partially connected films 31 and the annular part 211 and the deformation operation of the partially connected films 31 and the annular part 211 can be adjusted, and thus the dynamic properties (specifically, vibration damping properties (in particular, viscous damping properties)) can be adjusted.

In each of the embodiments described in the present specification, each of the one or plurality of partially connected films 31 may be connected to only one bone part 2B of the annular part 211, as in each of the embodiments of FIGS. 5, 8 to 9, and 11 to 13, or may be connected to only a plurality of bones 2B of the annular part 211, as in the embodiment of FIG. 10, or may be connected to one or a plurality of bone parts 2B and one or a plurality of coupling parts 2J of the annular part 211, which is not illustrated in the figures.

By adjusting the position and length of a connection portion between the partially connected film 31 and the annular part 211, the deformation operation of the partially connected film 31 and the annular part 211 can be adjusted, and thus the dynamic properties (specifically, vibration damping properties (in particular, viscous damping properties)) can be adjusted.

In each of the embodiments described in the present specification, each of the one or plurality of partially connected films 31 may be connected to only a part of each of the one or plurality of bone parts 2B of the annular part 211, as in each of the embodiments in FIGS. 5 and 8 to 13. In each of the embodiments of FIGS. 5, 8 to 9, and 11 to 13, the partially connected film 31 is connected to only a part of one bone part 2B of the annular part 211. In the embodiment of FIG. 10, the partially connected film 31 is connected to only a part of each of two bone parts 2B of the annular part 211. In these embodiments, the bone part 2B connected to the partially connected film 31 includes a connected portion 2BC that is a portion connected to the partially connected film 31, and root portions 3BR that are portions not connected to the partially connected film 31. In this case, the bone part 2B connected to the partially connected film 31 preferably has a pair of root portions 3BR on both sides of the connected portion 2BC in the extension direction of the bone part 2B, as in each of the embodiments of FIGS. 5 and 8 to 13.

However, in each of the embodiments described in the present specification, each of the one or plurality of partially connected films 31 may be connected entirely to each of the one or plurality of bone parts 2B of the annular part 211. In this case, the bone part 2B connected to the partially connected film 31 includes only a connected portion 2BC that is a portion connected to the partially connected film 31, and has no root portion 3BR that is a portion not connected to the partially connected film 31.

In these embodiments, when the porous structural body 1 is compressively or restoratively deformed, the root portion 3BR in the bone part 2B twists around the skeleton line O (FIG. 4) and functions as a hinge, causing the partially connected film 31 and the connected portion 2BC to integrally rotate around the skeleton line O (FIG. 4). By adjusting the length of the connected portion 2BC in the bone part 2B (and thus the ratio of the length of the connected portion 2BC to the overall length of the bone part 2B), the deformation operation of the partially connected film 31 and the bone part 2B can be adjusted, and thus the dynamic properties (specifically, the vibration damping properties (in particular, viscous damping properties)) can be adjusted.

For example, although the size and shape of the partially connected film 31 is almost the same between the embodiments of FIG. 5 and FIG. 9, the length of the connected portion 2BC in the bone part 2B (and thus, the ratio of the length of the connected portion 2BC to the overall length of the bone part 2B) is different, so the dynamic properties (specifically, vibration damping properties (in particular, viscous damping properties)) can differ.

When each of the one or plurality of partially connected films 31 is connected to only a part of each of the one or plurality of bone parts 2B of the annular part 211, as in each of the embodiments of FIGS. 5 and 8 to 13, in at least a part of bone parts 2B, out of the respective bone parts 2B connected to the one or plurality of partially connected films 31, the root portion 2BR that is the portion not connected to the partially connected film 31 may have the same cross-sectional area as the connected portion 2BC that is the portion connected to the partially connected film 31, as in each of the embodiments of FIGS. 5, 8 to 10, and 12 to 13, or may have a smaller cross-sectional area than the connected portion 2BC, as in the embodiment of FIG. 11, or may have a larger cross-sectional area than the connected portion BC, which is not illustrated in the figures.

By adjusting the cross-sectional area of the root portion 2BR in the bone part 2B (and thus the ratio of the cross-sectional area of the root portion 3BR to the cross-sectional area of the connected portion 2BC), the torsional ease (and thus, hinge function) of the root portion 3BR around the skeleton line O can be adjusted, and thus the dynamic properties (specifically, vibration damping properties (in particular, viscous damping properties)) can be adjusted.

From the same point of view, when each of the one or plurality of partially connected films 31 is connected to only a part of each of the one or plurality of bone parts 2B of the annular part 211, as in each of the embodiments of FIGS. 5 and 8 to 13, in at least a part of bone parts 2B, out of the respective bone parts 2B connected to the one or plurality of partially connected films 31, the root portion 2BR that is the portion not connected to the partially connected film 31 may have the same cross-sectional area as the bone part 2B that is not connected to the partially connected film 31, as in each of the embodiments of FIGS. 5, 8 to 10, and 12 to 13, or may have a smaller cross-sectional area than the bone part 2B that is not connected to the partially connected film 31, as in the embodiment of FIG. 11, or may have a larger cross-sectional area than the bone part 2B that is not connected to the partially connected film 31, which is not illustrated in the figures.

The cross-sectional areas of the connected portion 2BC and root portion 2BR refer to the cross-sectional areas of the connected portion 2BC and root portion 2BR in cross section perpendicular to the skeleton line O (FIG. 4), respectively.

In each of the embodiments described in the present specification, the connected portion 2BC in the bone part 2B may have the same cross-sectional area as the bone part 2B that is not connected to the partially connected film 31, as illustrated in FIGS. 5 and 8 to 13, or, although not illustrated in the figures, may have a smaller cross-sectional area than the bone part 2B that is not connected to the partially connected film 31, or, although not illustrated in the figures, may have a larger cross-sectional area than the bone part 2B that is not connected to the partially connected film 31.

The cross-sectional area of the connected portion 2BC in the bone part 2B tends to have less influence on dynamic properties, specifically vibration damping properties (in particular, viscous damping properties).

In each of the embodiments described in the present specification, the thickness T31 (FIG. 6) of the partially connected film 31 may be smaller than the width W0 (FIG. 6) of the connected portion 2BC of the bone part 2B to which the partially connected film 31 is connected, as in the embodiment of FIG. 6, or, although not illustrated in the figures, may be the same as the width W0 of the connected portion 2BC of the bone part 2B to which the partially connected film 31 is connected, or although not illustrated in the figures, may be larger than the width W0 of the connected portion 2BC of the bone part 2B to which the partially connected film 31 is connected.

By adjusting the thickness T31 of the partially connected film 31 (and thus, the ratio of the thickness T31 of the partially connected film 31 to the width W0 of the connected portion 2BC), the deformation operation of the partially connected film 31 can be adjusted, and therefore the dynamic properties (specifically, vibration damping properties (in particular, viscous damping properties)) can be adjusted.

From the same perspective, in each of the embodiments described in the present specification, the thickness T31 (FIG. 6) of the partially connected film 31 may be smaller than the width W0 (FIG. 1) of the bone part 2B that is not connected to the partially connected film 31, or, although not illustrated in the figures, may be same as the width W0 of the connected portion 2BC of the bone part 2B that is not connected to the partially connected film 31, or, although not illustrated in the figures, may be larger than the width W0 of the connected portion 2BC of the bone part 2B that is not connected to the partially connected film 31.

In each of the embodiments described in the present specification, in the one or plurality of annular parts 211, as illustrated in FIGS. 12 to 13, each separate partially connected film 31 may be connected to each bone part 2B of the annular part 211. In this case, there may be gaps between the partially connected films 31, as illustrated in FIGS. 12 to 13, or there may be no gap.

Even in such a case, by adjusting the length of the connected portions 2BC in the bone parts 2B, the cross-sectional area of the root portions 2BR when the bone parts 2B have the root portions 2BR, the thickness T31 of the partially connected films 31, the gaps between the partially connected films 31, and the like, as described above, the operation of air flowing in and out of the gaps between the partially connected films 31 and the annular part 211 and the gaps between the partially connected films 31, the deformation operation of the partially connected films 31 and the annular part 211 can be adjusted, and therefore the dynamic properties (in particular, the vibration damping properties (in particular, the viscous damping properties)) can be adjusted.

In this case, in the one or plurality of annular parts 211, as in the embodiment of FIG. 13, each separate partially connected film may be connected to each bone part 2B of the annular part 211, and an orifice (hole) 5 may be zoned by inner peripheral side end parts of the respective partially connected films 31. The shape of the orifice 5 may be circular, as in the example in FIG. 13, or any other shape. By adjusting the size and shape of the orifice 5, the air resistance of air passing through the orifice 5 and the deformation operation of the partially connected films 31 can be adjusted, and thus the dynamic properties (specifically, vibration damping properties (in particular, viscous damping properties)) can be adjusted.

In each of the embodiments described in the present specification, the shape of the partially connected film 31 may be any polygonal shape, such as triangular, quadrilateral, hexagonal, or the like, or circular or oval. In each of the examples in FIGS. 5 and 8 to 11, the shape of the partially connected film 31 is hexagonal (in the example of FIG. 9, approximately hexagonal). In each of the examples of FIGS. 12 to 13, the shape of the partially connected film 31 is triangular.

In each of the embodiments described in the present specification, the shape of the partially connected film 31 may be the same as the shape formed by the skeleton lines O (FIG. 4) of the annular part 211 connected to the partially connected film 31 (hexagonal in each of the examples of FIGS. 5 and 8 to 11), as in each of the examples of FIGS. 5 and 8 to 11, or may be different from the shape formed by the skeleton lines O of the annular part 211 connected to the partially connected films 31 (hexagonal in each of the examples of FIGS. 12 and 13), as in each of the examples of FIGS. 12 to 13.

In each of the embodiments described in the present specification, when the porous structural body 1 is in a natural state, the one or plurality of partially connected films 31 covering the virtual surface V1 may cover only a part of the virtual surface V1, as in each of the embodiments of FIGS. 5 and 8 to 13, or may cover the entire virtual surface V1.

In each of the embodiments described in the present specification, any virtual surface V1, out of the respective virtual surfaces V1 constituting the skeleton part 2, may be covered with one or a plurality of partially connected films 31. At least one of the respective small virtual surfaces V1S constituting the skeleton part 2 may be covered with one or a plurality of partially connected films 31, and/or at least one of the respective large virtual surfaces V1L constituting the skeleton part 2 may be covered with one or a plurality of partially connected films 31.

In each of the embodiments described in the present specification, the number, position, and structure of the partially connected films 31 may be different for each cell zoning part 21, as in the examples of FIGS. 1 to 2, or the number, position, and structure of the partially connected films 31 may be the same for each cell zoning part 21.

For example, at least one virtual surface V1L in each of the cell zoning parts 21 provided in the porous structural body 1 may be covered with one or a plurality of partially connected films 31.

The porous structural body 1 may have the structure of any plurality of embodiments, out of the first to seventh embodiments (FIGS. 5 and 8 to 13) described above, in each different annular part 211.

The partially connected film 31 is preferably made of the same material as the skeleton part 2. However, the partially connected film 31 may be made of a different material from the skeleton part 2.

In each of the examples illustrated in FIGS. 5 and 8 to 13, the partially connected film 31 is configured to be approximately flat, more specifically, to be flat. With respect to the partially connected film 31, "flat" is not limited to the case of being strictly flat, but is sufficient if the film is substantially flat, including the case of being curved, for example. When the partially connected film 31 is configured to be curved, the partially connected film 31 can function as a diaphragm.

Figure 14:
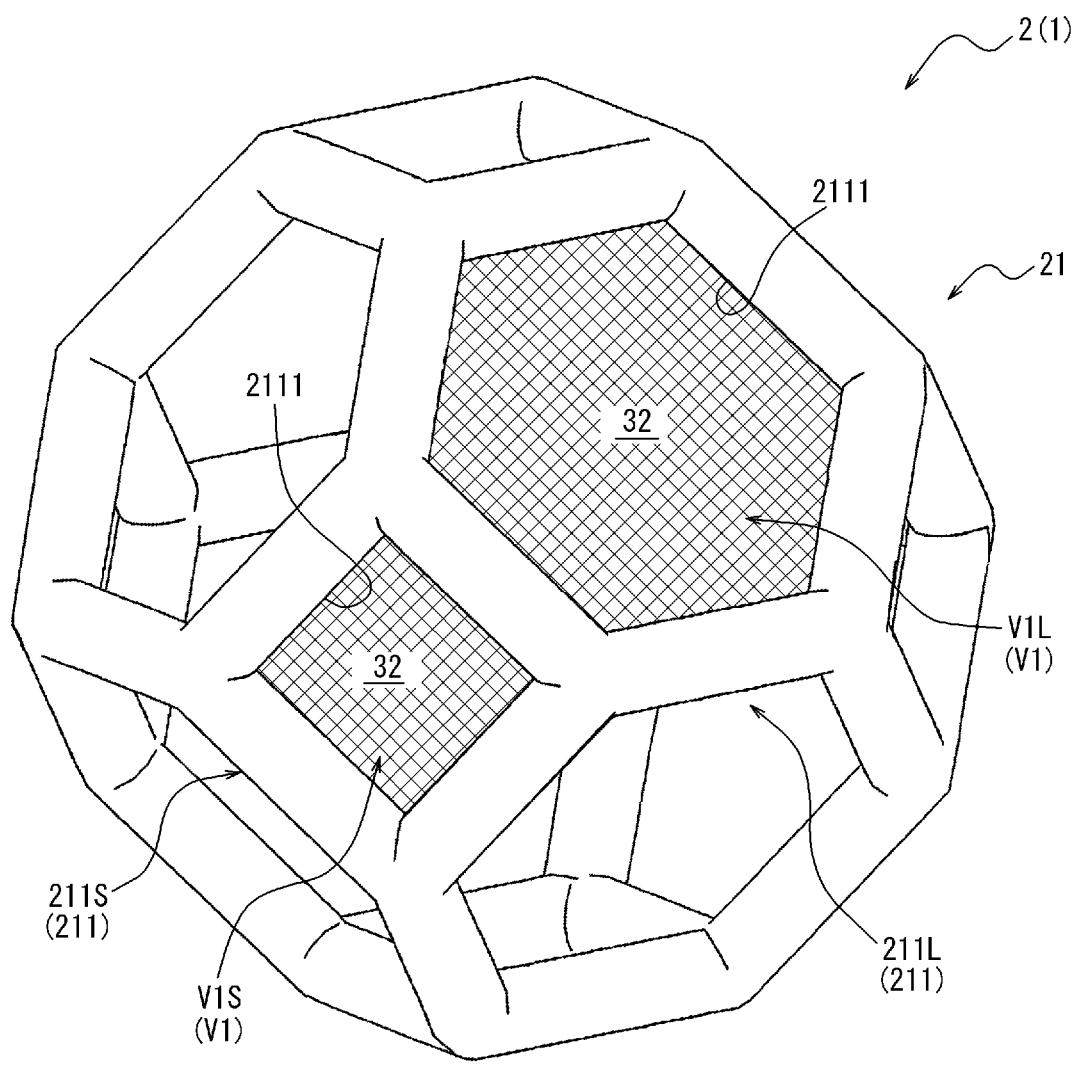
FIG. 14 is a diagram corresponding to FIG. 4, and is a perspective view illustrating a cell zoning part of a porous structural body according to an eighth embodiment of the present disclosure.

In each of the embodiments described in the present specification, as illustrated in FIG. 14, the porous structural body 1 may include one or a plurality of entirely connected films 32, in addition to the skeleton part 2 and the partially connected films 31.

The entirely connected film 32 extends over the virtual surface V1 zoned by the annular inner peripheral side edge part 2111 of the annular part 211, and thereby covers the virtual surface V1 zoned by the annular part 211. The entirely connected film 32 is connected to the entirety of the annular part 211 in the peripheral direction. Specifically, the entirely connected film 32 is connected to all of the annular inner peripheral side edge parts 2111 of the annular part 211 in the peripheral direction. The entirely connected film 32 is structured integrally with the skeleton part 2. The entirely connected film 32 is preferably made of the same material as the skeleton part 2. However, the entirely connected film 32 may be made of a different material from the skeleton part 2. In the example of FIG. 14, the entirely connected film 32 is structured to be approximately flat, or more specifically, structured to be flat. Note that, with respect to the entirely connected film 32, "approximately flat" is not limited to the case of being strictly flat, but it is sufficient if the entirely connected film 32 is substantially flat, including the case of being curved, for example. When the entirely connected film 32 is structured to be curved, the entirely connected film 32 can function like a diaphragm.

It is preferable that the entirely connected film 32 has a smaller thickness than the width W0 of the bone part 2B (FIG. 1).

The entirely connected film 32 prevents two cell holes C between the virtual surface V1 from being connected through the virtual surface V1, and ventilation through the virtual surface V1 is no longer possible, which in turn reduces the breathability of the porous structural body 1 as a whole. By adjusting the number of virtual surfaces V1 that are covered with the entirely connected films 32, out of the respective virtual surfaces V1 constituting the porous structural body 1, the ventilation of the porous structural body 1 as a whole can be adjusted, and various levels of ventilation can be achieved according to requirements.

At least one of the respective small virtual surfaces VIS constituting the skeleton part 2 may be covered with the entirely connected film 32, and/or at least one of the respective large virtual surfaces V1L constituting the skeleton part 2 may be covered with the entirely connected film 32.

The number and position of the entirely connected films 32 may be different for each cell zoning part 21, or the number and position of the entirely connected films 32 may be the same for each cell zoning part 21.

Note that, the porous structural body 1 does not have to include the entirely connected film 32.

[Seat Pad Including Porous Structural Body]

As described above, the porous structural body 1 according to each of the embodiments of the present disclosure can be used in a seat pad (in particular, car seat pad).

An example of a seat pad 302 that can include the porous structural body 1 according to any embodiment of the present disclosure will be described below with reference to FIG. 15.

Figure 15:
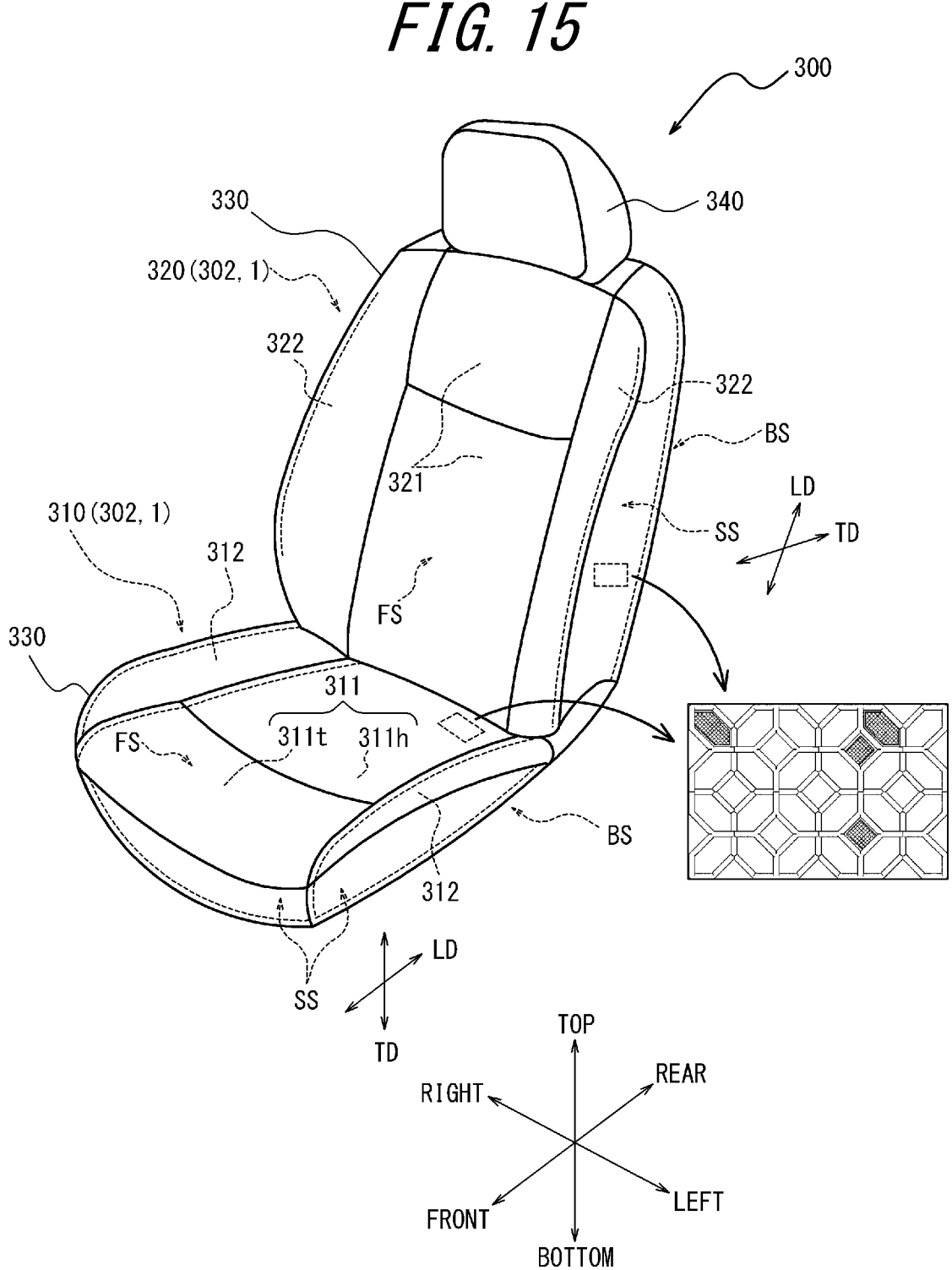
FIG. 15 is a perspective view schematically illustrating a car seat that can include a porous structural body according to any embodiment of the present disclosure.

FIG. 15 is a perspective view schematically illustrating an example of a car seat 300 including the seat pad 302 (car seat pad) that can be made of the porous structural body 1 according to various embodiments of the present disclosure.

As illustrated in FIG. 15 in dashed lines, the car seat 300 has a cushion pad 310 for a seated person to sit on and a back pad 320 for supporting the back of the seated person. The cushion pad 310 and the back pad 320 are each constituted of the seat pads 302. Hereinafter, the cushion pad 310 or the back pad 320 may be referred to simply as the "seat pad 302". The cushion pad 310 and the back pad 320 can each be made of the porous structural body 1 according to any embodiment described in the present specification. The XYZ orthogonal coordinate system (FIGS. 1 to 4) fixed to the porous structural body 1 may be oriented in any direction relative to the seat pad 302. In addition to the seat pad 302 constituting each of the cushion pad 310 and the back pad 320, the car seat 300 has, for example, an outer skin 330 covering a front side (seated person side) of the seat pad 302, a frame (not illustrated) supporting the cushion pad 310 from below, a frame (not illustrated) installed on a back side of the back pad 320, and a headrest 340 installed on an upper side of the back pad 320 to support the head of the seated person. The outer skin 330 is made of a material (such as fabric) with good breathability, for example. In the example of FIG. 15, the cushion pad 310 and the back pad 320 are configured separately from each other, but may be configured integrally with each other. In the example of FIG. 15, the headrest 340 is configured separately from the back pad 320, but the headrest 340 may be configured integrally with the back pad 320.

In the present specification, "top", "bottom", "left", "right", "front", and "rear" directions as viewed from the seated person seated on the car seat 300 (and thus seat pad 302) are simply referred to as "top", "bottom", "left", "right", "front", "rear", and the like, as indicated in FIG. 15, respectively.

The cushion pad 310 has a main pad portion 311 configured to support the buttocks and thighs of the seated person from below, and a pair of side pad portions 312 configured to be located on both the left and right sides of the main pad portion 311 and raised above the main pad portion 311 to support the seated person from both the left and right sides. The main pad portion 311 includes a lower thigh portion 311$t$, which is configured to support the thighs of the seated person from below, and a lower buttock portion 311$h$, which is located behind the lower thigh portion 311$t$ and configured to support the buttocks of the seated person from below.

The back pad 320 has main pad portions 321 configured to support the back of the seated person from the rear side, and a pair of side pad portions 322 configured to be located on both the left and right sides of the main pad portions 321 and raised to the front side above the main pad portions 321 to support the seated person from both the left and right sides.

In the present specification, an "extension direction (LD) of the seat pad (302)" is a direction perpendicular to a left-right direction and thickness direction (TD) of the seat pad 302, and in the case of the cushion pad 310, refers to a front-back direction (FIG. 15), and in the case of the back pad 320, refers to a direction in which the main pad portions 321 extend over a bottom surface to a top surface of the main pad portions 321 of the back pad 320 (FIG. 15).

Also, the "thickness direction (TD) of the seat pad (302)" refers to, in the case of the cushion pad 310, a top-bottom direction (FIG. 15), and, in the case of the back pad 320, a direction in which the main pad portion 321 extends over a seated person side surface (front surface FS) of the main pad portion 321 of the back pad 320 to a back surface BS (FIG. 15).

The "seated person side surface (front surface, FS)" of the seat pad (302) refers to an upper surface in the case of the cushion pad 310 (FIG. 15) and a front surface in the case of the back pad 320 (FIG. 15). The "back surface (BS)" of the seat pad (302) is a surface opposite the seated person side surface (FS) of the seat pad (302), and refers to a bottom surface in the case of the cushion pad 310 (FIG. 15) and a rear surface in the case of the back pad 320 (FIG. 15). A "side surface (SS)" of the seat pad (302) is a surface between the seated person side surface (FS) and the back surface (BS) of the seat pad (302), and refers to one of the front, rear, left, and right surfaces in the case of the cushion pad 310 (FIG. 15) and one of the bottom, top, left, and right surface (FIG. 15) in the case of the back pad 320.

In the example illustrated in FIG. 15, the porous structural body 1 constitutes the entire cushion pad 310 and back pad 320 of the seat pad 302, respectively.

However, the porous structural body 1 may constitute only one of the cushion pad 310, back pad 320, or headrest 340 of the seat pad 302.

The porous structural body 1 may constitute only a part of the cushion pad 310 of the seat pad 302, only a part of the back pad 320, and/or only a part of the headrest 340. This allows the size of the porous structural body 1 to be reduced and thus can be manufactured by a relatively small 3D printer. In such a case, the cushion pad 310, back pad 320, and headrest 340 of the seat pad 302, other than the parts made of the porous structural body 1, may be made of a conventional general porous structural body (foam) as described above, by being manufactured through a process of foaming by chemical reaction in, for example, mold forming, slab forming, or the like. For example, although not illustrated in the figures, the cushion pad 310, back pad 320, and/or headrest 340 of the seat pad 302 are each include a plurality of cushion portions separately constituted from each other, and only some (one or a plurality) of the plurality of cushion portions may be made of the porous structural bodies 1, and the other cushion portions may be made of porous structural bodies (foam) manufactured through a process of foaming by chemical reaction in, for example, mold forming, slab forming, or the like. More specifically, for example, each of the cushion pad 310, back pad 320, and/or headrest 340 of the seat pad 302 may include one or a plurality of inserts made of the porous structural bodies 1, and a main body that is structured separately from the one or plurality of inserts, that has a recess accommodating the one or plurality of inserts, that is made of a porous structural body (foam) manufactured through a process of foaming by chemical reaction in, for example, mold molding, slab molding, or the like.

Alternatively, the cushion pad 310, back pad 320, and/or headrest 340 of the seat pad 302 may be constituted of a plurality of cushion portions that are structured separately from each other, and each of the plurality of cushion portions may be made of the porous structural body 1. This also allows the size of the porous structural body 1 to be reduced, which in turn allows manufacture by a relatively small 3D printer.

The porous structural body 1 preferably constitutes at least a part of the main pad portions 311 or 321 of the cushion pad 310 or the back pad 320.

[Porous Structural Body Manufacturing Method]

Next, an example of a manufacturing method for the porous structural body 1 according to the present disclosure will be described with reference to FIG. 16. The method described below is a method for manufacturing the porous structural body 1 using a 3D printer, and can be suitably used to manufacture the porous structural body 1 according to any embodiment described in the present specification. FIG. 16 illustrates how the porous structural body 1 constituting a seat pad is manufactured.

First, three-dimensional shape data (e.g., three-dimensional CAD data) representing the three-dimensional shape of the porous structural body 1 is produced in advance using a computer.

Subsequently, the above three-dimensional shape data is converted into 3D shaping data 500 using the computer. The 3D shaping data 500 is read by a controller 410 of a 3D printer 400 when a shaping unit 420 of the 3D printer 400 performs shaping, and the controller 410 causes the shaping unit 420 to shape the porous structural body 1. The 3D shaping data 500 includes, for example, slice data representing a two-dimensional shape of each layer of the porous structural body 1.

Subsequently, shaping of the porous structural body 1 is performed by the 3D printer 400. The 3D printer 400 may perform the shaping using any shaping scheme such as an optical shaping scheme, a powder sintering lamination scheme, a heat melting lamination scheme (FDM scheme), or an ink jet scheme. FIG. 16 illustrates the shaping performed by the optical shaping scheme.

The 3D printer 400 includes, for example, the controller 410 made of a CPU or the like, the shaping unit 420 configured to perform shaping under control of the controller 410, a support table 430 on which an object to be shaped (i.e., porous structural body 1) is placed, and a housing body 440 in which liquid resin LR, the support table 430, and the object are housed. The shaping unit 420 includes a laser emitter 421 configured to emit ultraviolet laser light LL when the optical shaping scheme is used as in the present example. The housing body 440 is filled with the liquid resin LR. The liquid resin LR is cured into flexible resin through irradiation with the ultraviolet laser light LL emitted from the laser emitter 421.

In the 3D printer 400 configured as above, the controller 410 reads the 3D shaping data 500, and then shapes respective layers sequentially based on a three-dimensional shape included in the read 3D shaping data 500 while controlling emission of the ultraviolet laser light LL to the shaping unit 420.

After the shaping by the 3D printer 400 is completed, the shaped object is removed from the housing body 440. Thereby, the porous structural body 1 is finally obtained as the shaped object.

By using the 3D printer to manufacture the porous structural body 1, the porous structural body 1 with the partially connected films 31 can be realized as expected, in one process with little difficulty and high accuracy.

Note that, when the porous structural body 1 is made of resin, the porous structural body 1, as the shaped object, may be heated in an oven after the shaping by the 3D printer 400 is completed. In such a case, connection between the respective layers constituting the porous structural body 1 can be reinforced to thereby reduce anisotropy of the porous structural body 1, and thus the cushioning properties of the porous structural body 1 can be further improved.

When the porous structural body 1 is made of rubber, the porous structural body 1, as the shaped object, may be vulcanized after the shaping by the 3D printer 400 is completed.

INDUSTRIAL APPLICABILITY

The porous structural body and porous structural body manufacturing method according to the present disclosure are preferably used in cushion members, for example, are preferably used in any vehicle seats and any vehicle seat pads, and, in particular, are preferably used in car seats and car seat pads.

REFERENCE SIGNS LIST

1 porous structural body
2 skeleton part
2B bone part
2Be end part of bone part
2BC connected portion
3BR root portion
2J coupling part
21 cell zoning part
211 annular part
211L large annular part
211S small annular part
2111 inner peripheral side edge part
31 partially connected film
32 entirely connected film
5 orifice
C cell hole
O skeleton line
V1 virtual surface
V1L large virtual surface
V1S small virtual surface
300 car seat
302 seat pad
310 cushion pad
311 main pad portion (seated portion)
311*t* lower thigh portion
311*h* lower buttock portion
312 side pad portion
320 back pad
321 main pad portion
322 side pad portion
330 outer skin
340 headrest
FS seated person side surface (front surface)
SS side surface
BS back surface
TD thickness direction
LD extension direction
400 3D printer
410 controller
420 shaping unit
421 laser emitter
430 support table
440 housing body
LL ultraviolet laser light
LR liquid resin
500 3D shaping data

The invention claimed is:

1. A porous structural body made of flexible resin or rubber, the porous structural body comprising:
a skeleton part throughout its entirety,
wherein
the skeleton part comprises:
a plurality of bone parts; and
a plurality of coupling parts coupling end parts of the plurality of respective bone parts with each other,
the skeleton part has a plurality of annular parts each constituted of the plurality of bone parts and the plurality of coupling parts into an annular shape,
each of the annular parts zones a virtual surface by its inner peripheral side edge part,
at least a part of each of one or a plurality of the virtual surfaces is covered with one or a plurality of partially connected films, wherein only a part of each of the one or a plurality of virtual surfaces is covered by the one or a plurality of partially connected films, and an area of each of the one or a plurality of partially connected films is smaller than an area of a respective one of the virtual surfaces that each of the one or a plurality of partially connected films covers, and
each of the one or plurality of partially connected films is connected to only a part of the annular part in a peripheral direction.

2. The porous structural body according to claim 1, wherein each of the one or plurality of partially connected films is connected to only a part of each of one or a plurality of the bone parts of the annular part.

3. The porous structural body according to claim 2, wherein each of one or a plurality of the partially connected films is connected to the annular part at a plurality of portions in the peripheral direction.

4. The porous structural body according to claim 2, wherein in one or a plurality of the annular parts, the partially connected films separate from each other are connected to the respective bone parts of the annular part.

5. The porous structural body according to claim 2, wherein in one or a plurality of the annular parts, the partially connected films separate from each other are connected to the respective bone parts of the annular part, and an orifice is zoned by inner peripheral side end parts of the respective partially connected films.

6. The porous structural body according to claim 2, wherein the porous structural body is used in a cushion member.

7. The porous structural body according to claim 2, wherein in at least a part of the bone parts of the respective bone parts connected to the one or plurality of partially connected films, a portion not connected to the partially connected film has a smaller cross-sectional area than a portion connected to the partially connected film.

8. The porous structural body according to claim 7, wherein each of one or a plurality of the partially connected films is connected to the annular part at a plurality of portions in the peripheral direction.

9. The porous structural body according to claim 7, wherein in one or a plurality of the annular parts, the partially connected films separate from each other are connected to the respective bone parts of the annular part.

10. The porous structural body according to claim 7, wherein in one or a plurality of the annular parts, the partially connected films separate from each other are connected to the respective bone parts of the annular part, and an orifice is zoned by inner peripheral side end parts of the respective partially connected films.

11. The porous structural body according to claim 7, wherein the porous structural body is used in a cushion member.

12. The porous structural body according to claim 1, wherein each of one or a plurality of the partially connected films is connected to the annular part at a plurality of portions in the peripheral direction.

13. The porous structural body according to claim 12, wherein the porous structural body is used in a cushion member.

14. The porous structural body according to claim 1, wherein in one or a plurality of the annular parts, the partially connected films separate from each other are connected to the respective bone parts of the annular part.

15. The porous structural body according to claim 14, wherein the porous structural body is used in a cushion member.

16. The porous structural body according to claim 1, wherein in one or a plurality of the annular parts, the partially connected films separate from each other are connected to the respective bone parts of the annular part, and an orifice is zoned by inner peripheral side end parts of the respective partially connected films.

17. The porous structural body according to claim 16, wherein the porous structural body is used in a cushion member.

18. The porous structural body according to claim 1, wherein the porous structural body is used in a cushion member.

19. The porous structural body according to claim 1, wherein the porous structural body is shaped by a 3D printer.

20. A porous structural body manufacturing method comprising manufacturing, using a 3D printer, the porous structural body according to claim 1.

* * * * *